(12) United States Patent
Han et al.

(10) Patent No.: US 9,126,499 B2
(45) Date of Patent: Sep. 8, 2015

(54) ELECTRIC VEHICLE RUNNING CONTROL SYSTEM

(71) Applicants: Shenzhen BYD Auto R&D Company Limited, Shenzhen (CN); BYD Company Limited, Shenzhen (CN)

(72) Inventors: Yaochuan Han, Shenzhen (CN); Wei Feng, Shenzhen (CN); Qinyao Yang, Shenzhen (CN); Xianyin Li, Shenzhen (CN)

(73) Assignees: Shenzhen BYD Auto R&D Company Limited, Shenzhen (CN); BYD Company Limited, Shenzhen (CN)

( * ) Notice: Subject to any disclaimer, the term of this patent is extended or adjusted under 35 U.S.C. 154(b) by 0 days.

(21) Appl. No.: 14/373,109

(22) PCT Filed: Jan. 18, 2013

(86) PCT No.: PCT/CN2013/070647
§ 371 (c)(1),
(2) Date: Jul. 18, 2014

(87) PCT Pub. No.: WO2013/107373
PCT Pub. Date: Jul. 25, 2013

(65) Prior Publication Data
US 2015/0001927 A1    Jan. 1, 2015

(30) Foreign Application Priority Data

Jan. 18, 2012   (CN) .......................... 2012 1 0015412

(51) Int. Cl.
*H01M 10/625* (2014.01)
*B60R 16/03* (2006.01)
(Continued)

(52) U.S. Cl.
CPC ............... *B60L 11/1875* (2013.01); *B60L 1/02* (2013.01); *B60L 11/005* (2013.01); *B60R 16/02* (2013.01); *H01M 10/5006* (2013.01);
(Continued)

(58) Field of Classification Search
USPC .......... 307/9.1, 10.1, 10.7; 320/150, 153, 154
See application file for complete search history.

(56) References Cited

U.S. PATENT DOCUMENTS 6,078,163 A * 6/2000 Horie et al. ................... 320/104
6,340,879 B1 1/2002 Bläcker
(Continued)

FOREIGN PATENT DOCUMENTS

| CN | 201667552 U | * 12/2010 |
|---|---|---|
| CN | 102082306 | 1/2011 |
| CN | 102074752 | 5/2011 |
| CN | 102074754 | 5/2011 |
| CN | 202111197 | 11/2012 |
| CN | 202541451 | 11/2012 |
| WO | WO 2009/099342 | 8/2009 |

OTHER PUBLICATIONS

International Search Report and Written Opinion of the International Searching Authority for Application No. PCT/CN2013/070647, dated May 9, 2013.

*Primary Examiner* — Jared Fureman
*Assistant Examiner* — Carlos Laguerre
(74) *Attorney, Agent, or Firm* — Alston & Bird LLP

(57) ABSTRACT

An electric vehicle running control system is provided. The electric vehicle running control system comprises: a heating circuit (11); a load capacitor (C12); a switchgear (20) connected with the heating circuit (11) and the load capacitor (C12) respectively; and a switch control module (200) connected with the switchgear (20) for controlling the switchgear (20) to switch off when the heating circuit (11) is connected with an in-vehicle battery (5) to form a heating loop for heating the in-vehicle battery (5).

26 Claims, 11 Drawing Sheets

(51) Int. Cl.
*B60L 11/18* (2006.01)
*B60L 1/02* (2006.01)
*B60L 11/00* (2006.01)
*H01M 10/615* (2014.01)
*H01M 10/657* (2014.01)
*B60R 16/02* (2006.01)

(52) U.S. Cl.
CPC ..... *H01M 10/5016* (2013.01); *H01M 10/5081* (2013.01); *B60L 2210/30* (2013.01); *B60L 2240/545* (2013.01); *B60L 2240/547* (2013.01); *B60L 2240/549* (2013.01); *Y02T 10/7005* (2013.01); *Y02T 10/705* (2013.01); *Y02T 10/7022* (2013.01); *Y02T 10/7241* (2013.01); *Y02T 10/7258* (2013.01)

(56) References Cited

U.S. PATENT DOCUMENTS

| | | | |
|---|---|---|---|
| 6,373,232 B1 * | 4/2002 | Mano et al. | 323/282 |
| 8,816,634 B2 * | 8/2014 | Xu et al. | 320/107 |
| 8,816,647 B2 * | 8/2014 | Xu et al. | 320/150 |
| 8,823,317 B2 * | 9/2014 | Xu et al. | 320/103 |
| 8,836,277 B2 * | 9/2014 | Xu et al. | 320/107 |
| 8,836,288 B2 * | 9/2014 | Xu et al. | 320/129 |
| 8,841,883 B2 * | 9/2014 | Xu et al. | 320/128 |
| 2009/0121702 A1 * | 5/2009 | Li et al. | 323/351 |
| 2010/0085020 A1 * | 4/2010 | Suzuki et al. | 320/157 |
| 2011/0144861 A1 * | 6/2011 | Lakirovich et al. | 701/36 |
| 2011/0298427 A1 * | 12/2011 | Uemura et al. | 320/134 |
| 2012/0015222 A1 * | 1/2012 | Kosugi et al. | 429/93 |
| 2012/0133329 A1 * | 5/2012 | Yoshida et al. | 320/116 |

* cited by examiner

ELECTRIC VEHICLE RUNNING CONTROL SYSTEM

CROSS-REFERENCE TO RELATED APPLICATION

This application is a national phase entry of PCT/CN2013/070647 filed Jan. 18, 2013, which claims priority to and the benefits of Chinese Patent Application Serial No. 201210015412.3, filed with the State Intellectual Property Office of P. R. China on Jan. 18, 2012, the entire contents both of which are incorporated herein by reference.

FIELD

The present disclosure relates to a power electrics field, and more particularly to an electric vehicle running control system.

BACKGROUND

As electric vehicles need to run under complicated road conditions and environment conditions, an in-vehicle battery as a power of the electric vehicles needs to adapt to these conditions. Especially when the electric vehicles are in a low temperature environment, the in-vehicle battery needs to have excellent performances of discharging and charging in the low temperature environment and high input/output power. In general, a resistance and a polarization of the in-vehicle battery may be increased in the low temperature, which may reduce a capacity of the in-vehicle battery. Therefore, in order to keep the capacity of the in-vehicle battery in the low temperature, electric vehicles are provided with a heating circuit of the in-vehicle battery.

FIG. 1 is a schematic diagram of an electric vehicle running control system according to the prior art. As shown in FIG. 1, the heating circuit F is connected with the in-vehicle battery E to form a heating loop. By controlling an energy to flow between the in-vehicle battery E and the heating circuit F so as to heat a damping element in the heating circuit F, the in-vehicle battery E is heated, which increases the charging and discharging performance of the in-vehicle battery E.

However, if the in-vehicle circuit needs to be heated as the electric vehicle is running in low temperature, as a load capacitor C also needs to supply power for a vehicle load R continuously, the heating circuit F and the load capacitor C will work simultaneously. Then, the working of the heating circuit F may cause the voltage of the in-vehicle battery E to fluctuate violently (even to become a negative value), and meanwhile the heating circuit may not work normally due to the influence of the loading circuit, as shown in FIG. 2. FIG. 2 is a schematic diagram of voltage waveforms of the heating circuit F and the load capacitor C in FIG. 1, in which $V_F$ is a voltage of the heating circuit F, and $V_C$ is an output voltage of the load capacitor C.

SUMMARY

The present disclosure is aimed to solve at least one of the problems, particularly defects that a heating circuit can not work normally due to an interference between a heating circuit and a load capacitor caused by heating during the running.

According to embodiments of the present disclosure, an electric vehicle running control system is provided. The system comprises: a heating circuit; a load capacitor; a switchgear connected with the heating circuit and the load capacitor respectively; and a switch control module connected with the switchgear for controlling the switchgear to switch off when the heating circuit is connected with an in-vehicle battery to form a heating loop for heating the in-vehicle battery.

In one embodiment, when the heating circuit is disconnected from the in-vehicle battery, the switch control module controls the switchgear to switch on, and the in-vehicle battery charges the load capacitor.

In one embodiment, the heating circuit comprises a damping element, a bidirectional switchgear, a first current storage element and a first charge storage element, the damping element and the first current storage element are connected in series to form a first part, the bidirectional switchgear and the first charge storage element are connected in series to form a second part, one end of the first part is connected with a positive electrode of the in-vehicle battery, the other end of the first part is connected with one end of the second part and one end of the switchgear respectively, and the other end of the second part is connected with the load capacitor and a negative electrode of the in-vehicle battery.

In one embodiment, the system further comprises a heating circuit control module configured for controlling the heating circuit to connect with or disconnect from the in-vehicle battery by controlling the bidirectional switchgear to switch on or off.

In one embodiment, the heating circuit control module is integrated together with the switch control module.

In one embodiment, the damping element is an internal parasitic resistor of the in-vehicle battery, and the first current storage element is an internal parasitic inductor of the in-vehicle battery. In another embodiment, the damping element is a resistor, the first current storage element is an inductor, and the first charge storage element is a capacitor.

In one embodiment, the switchgear is a first bidirectional switch. In another embodiment, the switchgear comprises a second bidirectional switch and a third bidirectional switch connected in reverse series, and the switch control module is connected with the second bidirectional switch and the third bidirectional switch respectively.

In one embodiment, the heating circuit further comprises an energy summing unit for summing an energy in the heating circuit and an energy in the in-vehicle battery after the bidirectional switchgear is switched off from a switched-on state, and the energy summing unit comprises a polarity reversing unit for reversing a voltage polarity of the first charge storage element after the bidirectional switchgear is switched off from the switched-on state.

In another embodiment, the heating circuit further comprises an energy transferring unit for transferring an energy in the heating circuit to an energy storage element after the bidirectional switchgear is switched off from a switched-on state, and the energy transferring unit comprises an electric power recharging unit for transferring the energy in the heating circuit to the energy storage element after the bidirectional switchgear is switched off from the switched-on state.

In yet another embodiment, the heating circuit further comprises an energy summing and transferring unit for transferring a part of an energy in the heating circuit to an energy storage element after the bidirectional switchgear is switched off from a switched-on state, and then summing a remaining energy in the heating circuit and an energy in the in-vehicle battery.

In one embodiment, the energy summing and transferring unit comprises an energy summing unit and an energy transferring unit, the energy transferring unit is configured for transferring the part of the energy in the heating circuit to the energy storage element after the bidirectional switchgear is switched off from the switched-on state, the energy summing unit is configured for summing the remaining energy in the heating circuit and the energy in the in-vehicle battery after the part of the energy is transferred by the energy transferring unit, the energy transferring unit comprises the electric power recharging unit for transferring the part of the energy in the heating circuit to the energy storage element after the bidirectional switchgear is switched off from the switched-on state, and the energy summing unit comprises the polarity reversing unit for reversing the voltage polarity of the first charge storage element after the part of the energy is transferred by the electric power recharging unit.

In one embodiment, the polarity reversing unit comprises: a first single-pole double-throw switch located at both ends of the first charge storage element and a second single-pole double-throw switch located at both ends of the first charge storage element, a lead-in wire of the first single-pole double-throw switch is connected in the heating circuit, a first lead-out wire of the first single-pole double-throw switch is connected with a first pole plate of the first charge storage element, a second lead-out wire of the first single-pole double-throw switch is connected with a second pole plate of the first charge storage element, a lead-in wire of the second single-pole double-throw switch is connected in the heating circuit, a first lead-out wire of the second single-pole double-throw switch is connected with the second pole plate of the first charge storage element, a second lead-out wire of the second single-pole double-throw switch is connected with the first pole plate of the first charge storage element, and the heating circuit control module is connected with the first single-pole double-throw switch and the second single-pole double-throw switch respectively, for reversing the voltage polarity of the first charge storage element by changing respective connection relations between the lead-in wire and the lead-out wires of the first single-pole double-throw switch and the second single-pole double-throw switch.

In another embodiment, the polarity reversing unit comprises: a second current storage element; a first switch, in which the first switch, the first charge storage element, and the second current storage element are connected in series sequentially to form a loop, and the heating circuit control module is connected with the first switch, for reversing the voltage polarity of the first charge storage element by controlling the first switch to switch on; and a first unidirectional semiconductor element, in which the first unidirectional semiconductor element is connected in series between the first charge storage element and the second current storage element or between the second current storage element and the first switch.

In yet another embodiment, the polarity reversing unit comprises: a second charge storage element; and a first DC-DC module, in which the heating circuit control module is connected with the first DC-DC module for transferring an energy in the first charge storage element to the second charge storage element, and then reversely transferring an energy in the second charge storage element back to the first charge storage element, by controlling the first DC-DC module, so as to reverse the voltage polarity of the first charge storage element.

In one embodiment, the electric power recharging unit comprises a second DC-DC module, and the heating circuit control module is connected with the second DC-DC module for transferring an energy in the first charge storage element to the in-vehicle battery, by controlling the second DC-DC module.

In one embodiment, the energy summing and transferring unit comprises a third DC-DC module, and the heating circuit control module is connected with the third DC-DC module for transferring a part of an energy in the first charge storage element to the energy storage element, and then summing a remaining energy in the first charge storage element and the energy in the in-vehicle battery, by controlling the third DC-DC module.

In one embodiment, the system further comprises an energy limiting circuit for limiting a current flowing from the heating circuit to the in-vehicle battery.

In one embodiment, the bidirectional switchgear comprises: a first unidirectional branch for realizing a flowing of an energy from the in-vehicle battery to the heating circuit; and a second unidirectional branch for realizing a flowing of an energy from the heating circuit to the in-vehicle battery. The heating circuit control module is connected with the first unidirectional branch and/or the second unidirectional branch for controlling the first unidirectional branch and/or the second unidirectional branch connected to be on or off.

In one embodiment, the energy limiting circuit comprises a third current storage element connected in series in the second unidirectional branch.

In one embodiment, the bidirectional switchgear comprises a second switch, a second unidirectional semiconductor element and a third unidirectional semiconductor element, the second switch and the second unidirectional semiconductor element are connected in series to form the first unidirectional branch, the third unidirectional semiconductor element forms the second unidirectional branch, the heating circuit control module is connected with the second switch for controlling the first unidirectional branch to be on or off by controlling the second switch to switch on or off, and the third current storage element is connected with the third unidirectional semiconductor element in series.

In one embodiment, the bidirectional switchgear further comprises a third switch in the second unidirectional branch, the third switch is connected with the third unidirectional semiconductor element in series, the heating circuit control module is connected with the third switch for controlling the second unidirectional branch to be on or off by controlling the third switch to switch on or off, and the third current storage element is connected in series between the third unidirectional semiconductor element and the third switch.

In one embodiment, the heating circuit further comprises a fourth unidirectional semiconductor element, a fifth unidirectional semiconductor element, a fourth switch, and a fifth switch, a cathode of the fifth unidirectional semiconductor element is connected between the third switch and the third current storage element, an anode of the fifth unidirectional semiconductor element is connected to one end of the fifth switch, and the other end of the fifth switch is connected to a negative electrode of the in-vehicle battery; an anode of the fourth unidirectional semiconductor element is connected between the third unidirectional semiconductor element and the third current storage element, a cathode of the fourth unidirectional semiconductor element is connected to one end of the fourth switch, and the other end of the fourth switch is connected to the negative electrode of the in-vehicle battery; and the heating circuit control module is connected with the fourth switch and the fifth switch respectively for controlling the fourth switch and the fifth switch to switch on or off.

In one embodiment, the heating circuit control module is configured for: controlling the second switch and the third switch to switch on to enable an energy to flow from the in-vehicle battery to the first charge storage element and to flow from the first charge storage element to the in-vehicle battery; switching off the third switch and switching on the fifth switch when a voltage applied to the first charge storage element is greater than a first predetermined voltage of the in-vehicle battery; and switching off the fifth switch and switching on the third switch and the fourth switch when a current flowing through the third current storage element is zero, to enable the voltage polarity of the first charge storage element to reverse.

In another embodiment, the heating circuit control module is configured for: controlling the second switch and the third switch to switch on to enable an energy to flow from the in-vehicle battery to the first charge storage element and to flow from the first charge storage element to the in-vehicle battery; switching off the third switch and switching on the fifth switch when a voltage applied to the first charge storage element is less than or equal to a second predetermined voltage of the in-vehicle battery; switching off the fifth switch and switching on the third switch and the fourth switch when a current flowing through the third current storage element reaches a second predetermined current; switching off the fourth switch when the current flowing through the third current storage element reaches a first predetermined current, to enable an energy in the third current storage element to flow to the in-vehicle battery; and switching on the third switch and the fourth switch when the current flowing through the third current storage element is zero, to enable the voltage polarity of the first charge storage element to reverse.

According to the electric vehicle running control system of the present disclosure, the switch control module controls the switchgear to switch off when the heating circuit is connected with an in-vehicle battery to form a heating loop for heating the in-vehicle battery. Therefore, when the in-vehicle battery is heated (that is, the heating loop formed by the heating circuit and the in-vehicle battery is closed), the switchgear can control the in-vehicle battery to disconnect from the load capacitor, which stops the in-vehicle battery from supplying power to the load capacitor. Thus, the heating circuit and the load capacitor may work at different times to avoid interfering each other.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
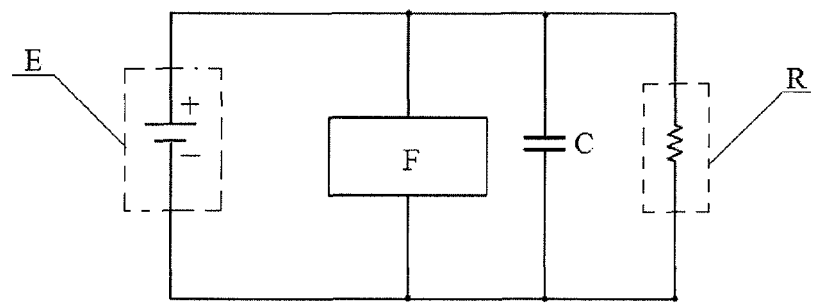
FIG. 1 is a schematic diagram of an electric vehicle running control system according to the prior art.
Figure 2:
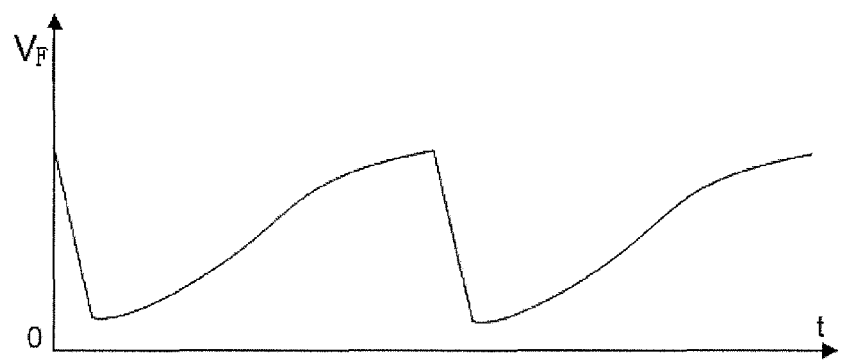
FIG. 2 shows schematic waveform charts of a heating circuit and a load capacitor in FIG. 1.
Figure 2:
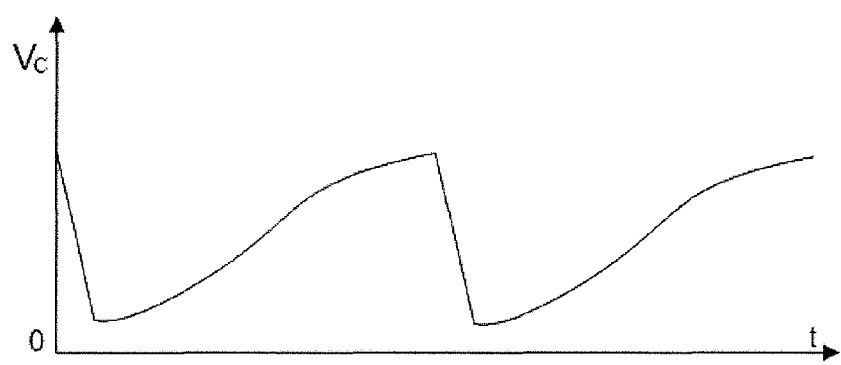

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

It should be noted that, unless otherwise specified, in the following description, the term "heating circuit controlling module" refers to any controller which can output control instructions (such as a pulse waveform) according to predetermined conditions or at predetermined times to control a heating circuit connected to switch on or off correspondingly, such as a PLC (Programming Logic Controller); the term "bidirectional switch" refers to any bidirectional switch that can realize on-off controlling according to electric signals or self-characteristics, such as a MOSFEF (Metal Oxide Semiconductor Field Effect Transistor) or an IGBT (Insulated Gate Bipolar Transistor) with a reverse freewheeling diode; the term "charge storage element" refers to any device which can storage charges, such as a capacitor; the term "current storage element" refers to any device that can storage a current, such as an inductor; the term "forward direction" refers to a direction that an energy flows from the in-vehicle battery to the heating circuit, the term "reverse direction" refers to a direction that the energy flows from the heating circuit to the in-vehicle battery; the term "in-vehicle battery" comprises a primary battery (such as a dry battery or an alkaline battery) and a secondary battery (such as a lithium ion battery, a nickel cadmium battery, a nickel-metal hydride battery or a lead-acid battery); the term "damping element" refers to any device that consumes the energy by blocking the current flowing, such as a resistor; and the term "heating loop" refers to a loop formed by the in-vehicle battery and the heating circuit.

In the following, the electric vehicle running control system according to the present disclosure will be described in detail with reference to the accompanied drawings.

Figure 3:
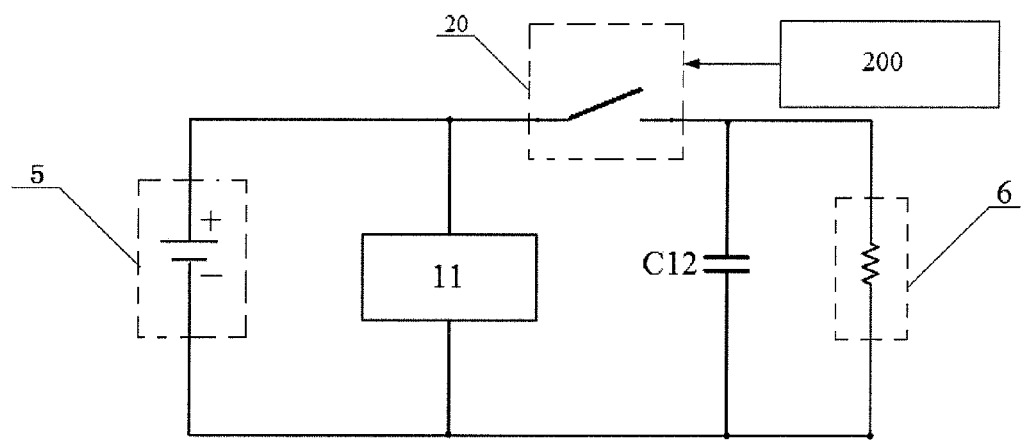
FIG. 3 is a schematic diagram of an electric vehicle running control system according to an embodiment of the present disclosure.

FIG. 3 is a schematic diagram of an electric vehicle running control system according to an embodiment of the present disclosure. As shown in FIG. 3, the system comprises a heating circuit 11 and a load capacitor C12. The heating circuit 11 is configured to connect with the in-vehicle battery 5 to form a heating loop. The load capacitor C12 is configured to supply energy to a vehicle load 6. The system further comprises a switchgear 20 and a switch control module 200. The switchgear 20 is connected with the load capacitor C12 and the in-vehicle battery 5 respectively. The switch control module 200 is connected with the switchgear 20 for controlling the switchgear 20 to switch off when the heating circuit 11 is connected with the in-vehicle battery 5 to form a heating loop for heating the in-vehicle battery 5.

In order to prolong a life time of the in-vehicle battery 5, the heating circuit 11 is connected with the in-vehicle battery 5 in a low temperature so that the in-vehicle battery 5 can be heated by the heating circuit 11. When a heating condition is reached, the in-vehicle battery 5 is heated, and when a stopping heating condition is reached, the heating circuit 11 is disconnected from the in-vehicle battery 5.

Figure 4:
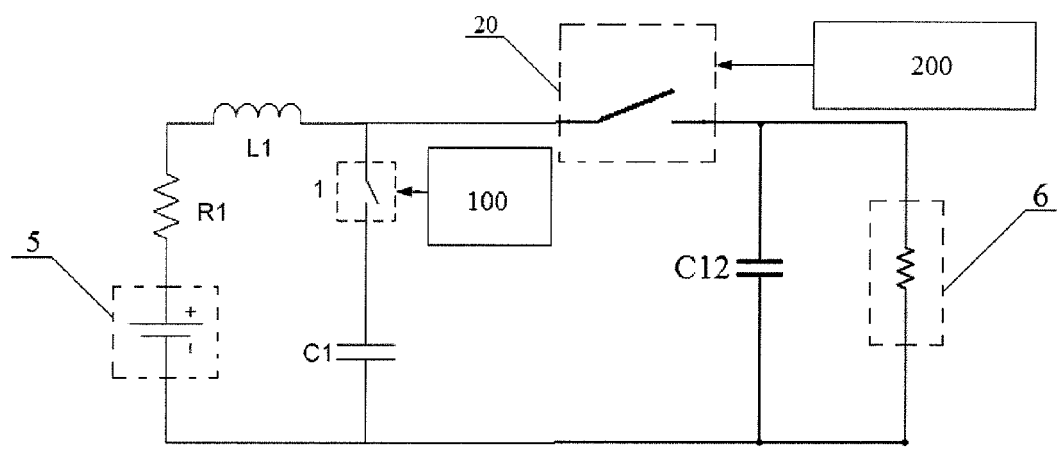
FIG. 4 is a schematic diagram of a heating circuit in the electric vehicle running control system according to an embodiment of the present disclosure.

FIG. 4 is a schematic diagram of the heating circuit 11 in the electric vehicle running control system according to an embodiment of the present disclosure. As shown in FIG. 4, the heating circuit 11 comprises a damping element R1, a bidirectional switchgear 1, a current storage element L1 and a charge storage element C1. The damping element R1 and the current storage element L1 are connected in series to form a first part. The bidirectional switchgear 1 and the charge storage element C1 are connected in series to form a second part. One end of the first part is connected with a positive electrode of the in-vehicle battery 5, the other end of the first part is connected with one end of the second part and one end of the switchgear 20 respectively, and the other end of the second part is connected with the load capacitor C12 and a negative electrode of the in-vehicle battery 5 respectively. Specifically, one end of the damping element R1 is connected with the positive electrode of the in-vehicle battery 5, the other end of the damping element R1 is connected with one end of the current storage element L1, the other end of the current storage element L1 is connected with one end of the bidirectional switchgear 1 and one end of the switchgear 20 respectively, the other end of the switchgear 20 is connected with one end of the load capacitor C12, the other end of the load capacitor C12 is connected with one end of the charge storage element C1 and the negative electrode of the in-vehicle battery 5 respectively. Further, it should be understood that the example in FIG. 4 is only illustrative and not intended to limit the present disclosure. In other embodiments, the damping element R1 and the current storage element L1 may be exchanged, and/or the bidirectional switchgear 1 and the charge storage element C1 may be exchanged.

Furthermore, it should be noted that, considering different characters of different types of in-vehicle batteries, in the present disclosure, the "in-vehicle battery" may refer to an ideal battery which does not comprise an internal parasitic resistor or an internal parasitic inductor, or to an ideal battery in which both the internal parasitic resistor and the internal parasitic inductor are very small. The "in-vehicle battery" may also refer to a battery pack which comprises the internal parasitic resistor and the internal parasitic inductor. Therefore, it should be understood by the person skilled in the art that, when the "in-vehicle battery" refers to the ideal battery which does not comprise the internal parasitic resistor or the internal parasitic inductor, or to the ideal battery in which both the internal parasitic resistor and the internal parasitic inductor are very small, the damping element R1 is an external damping element of the in-vehicle battery, the current storage element L1 is an external current storage element of the in-vehicle battery; when the "in-vehicle battery" refers to the battery pack which comprises the internal parasitic resistor and the internal parasitic inductor, the damping element R1 may be the external damping element of the battery pack or the internal parasitic resistor of the battery pack, and similarly, the current storage element L1 may be the external current storage element of the battery pack or the internal parasitic inductor of the battery pack.

As shown in FIG. 4, the system may further comprise a heating circuit control module 100. The heating circuit control module 100 is connected with the bidirectional switchgear 1, and is configured to control the heating circuit 11 to connect with or disconnect from the in-vehicle battery 5 by controlling the bidirectional switchgear 1 to switch on or off.

Thus, when the heating condition is reached, the heating circuit control module 100 controls the bidirectional switchgear 1 to switch on, and the in-vehicle battery 5 is connected with the heating circuit 11 to form the loop. The in-vehicle battery 5 discharges through the loop, that is, the charge storage element C1 is charged by the in-vehicle battery 5. When the current in the loop comes back to zero from a forward peak current, the charge storage element C1 starts to discharge though the loop, that is, the in-vehicle battery 5 is charged by the charge storage element C1. During the charging and discharging of the in-vehicle battery 5, both the forward current and the reverse current in the loop can flow through the damping element R1, and thus the in-vehicle battery 5 is heated by the heating of the damping element R1. When the stopping heating condition is reached, the heating circuit control module 100 controls the bidirectional switchgear 1 to switch off to make the heating circuit 11 stop working.

Thus, when the electric vehicle is heated, that is, the heating loop formed by the heating circuit 11 and the in-vehicle battery 5 is closed, the switchgear 20 can control the in-vehicle battery 5 to disconnect from the load capacitor C12, which stops the in-vehicle battery 5 from supplying energy to the load capacitor C12. Therefore, the heating circuit 11 and the load capacitor C12 may work at different times to avoid interfering each other.

Figure 5:
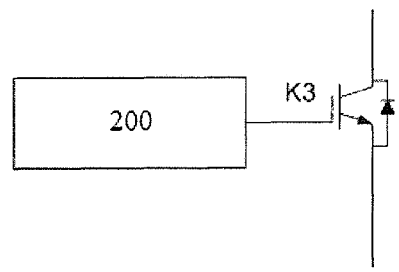
FIG. 5 is a schematic diagram of an embodiment of the switchgear in FIG. 4.

FIG. 5 is a schematic diagram of an embodiment of the switchgear 20 in FIG. 4. As shown in FIG. 5, the switchgear 20 is a bidirectional switch K3. The switch control module 200 controls the in-vehicle battery 5 to disconnect from the load capacitor C12 by controlling the bidirectional switch K3 to switch off.

Figure 6:
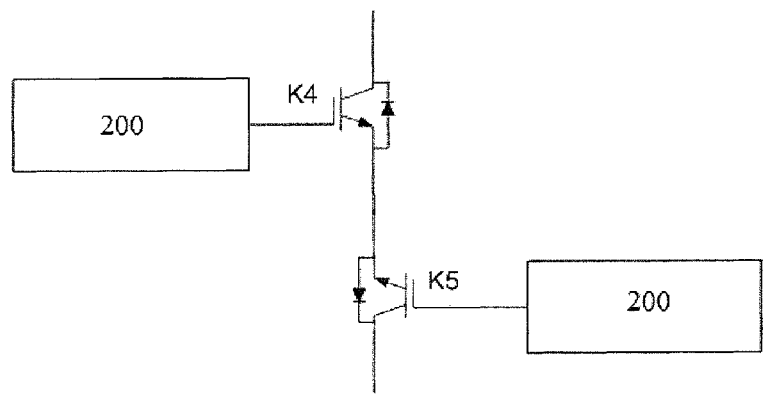
FIG. 6 is a schematic diagram of an embodiment of the switchgear in FIG. 4.

FIG. 6 is a schematic diagram of another embodiment of the switchgear 20 in FIG. 4. As shown in FIG. 6, the switchgear 20 comprises a bidirectional switch K4 and a bidirectional switch K5 connected in reverse series. The switch control module 200 is connected with the bidirectional switch K4 and the bidirectional switch K5 respectively for controlling the in-vehicle battery 5 to disconnect from the load capacitor C12 by controlling the bidirectional switch K4 and the bidirectional switch K5 to switch off. In the embodiment, the switch control module 200 may be a single controller for controlling different external switches to switch on or off by a preset internal program. The switch control module 200 may also be a plurality of controllers, for example, each external switch is provided with a corresponding switch control module 200 respectively. Alternatively, the polarity of switch control modules 200 may be integrated together. The structure of the switch control module 200 is not limited by the present disclosure.

In an embodiment, the heating circuit control module 100 is integrated together with the witch control module 200. A working process of the electric vehicle running control system according to the present disclosure will be described as follows with reference to FIGS. 7 and 8.

Figure 7:
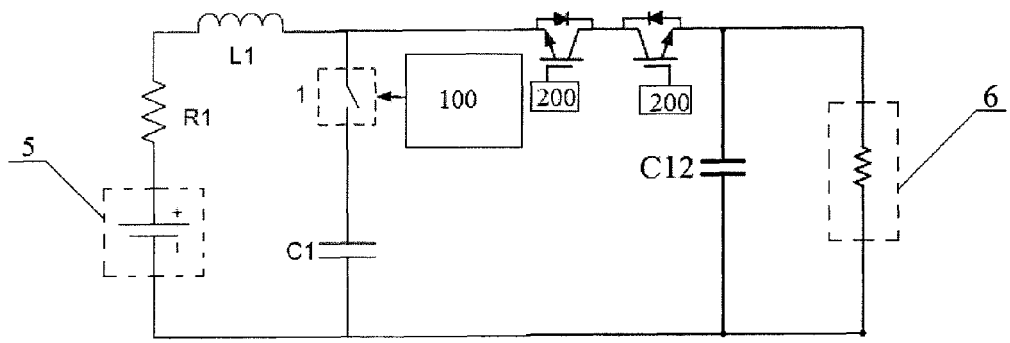
FIG. 7 is a schematic diagram of the electric vehicle running control system according to an embodiment of the present disclosure.

FIG. 7 is a schematic diagram of the electric vehicle running control system according to an embodiment of the present disclosure. As shown in FIG. 7, the heating circuit 11 comprises the damping element R1, the bidirectional switchgear 1, the current storage element L1 and the charge storage element C1 connected in series. The heating circuit 11 is connected with the vehicle battery 5 to form a heating loop. The load capacitor C12 is connected with the vehicle load 6 in parallel for supplying energy to the vehicle load 6. The heating circuit control module 100 is connected with the bidirectional switchgear 1 for controlling the heating circuit 11 to connect with or disconnect from the in-vehicle battery 5 by controlling the bidirectional switchgear 1 to switch on or off. The switchgear 20 comprises the bidirectional switch K4 and the bidirectional switch K5 connected in reverse series. The switch control module 200 is connected with the bidirectional switch K4 and the bidirectional switch K5 respectively for controlling the in-vehicle battery 5 to disconnect from the load capacitor C12 by controlling the bidirectional switch K4 and the bidirectional switch K5 to switch off.

Figure 8:
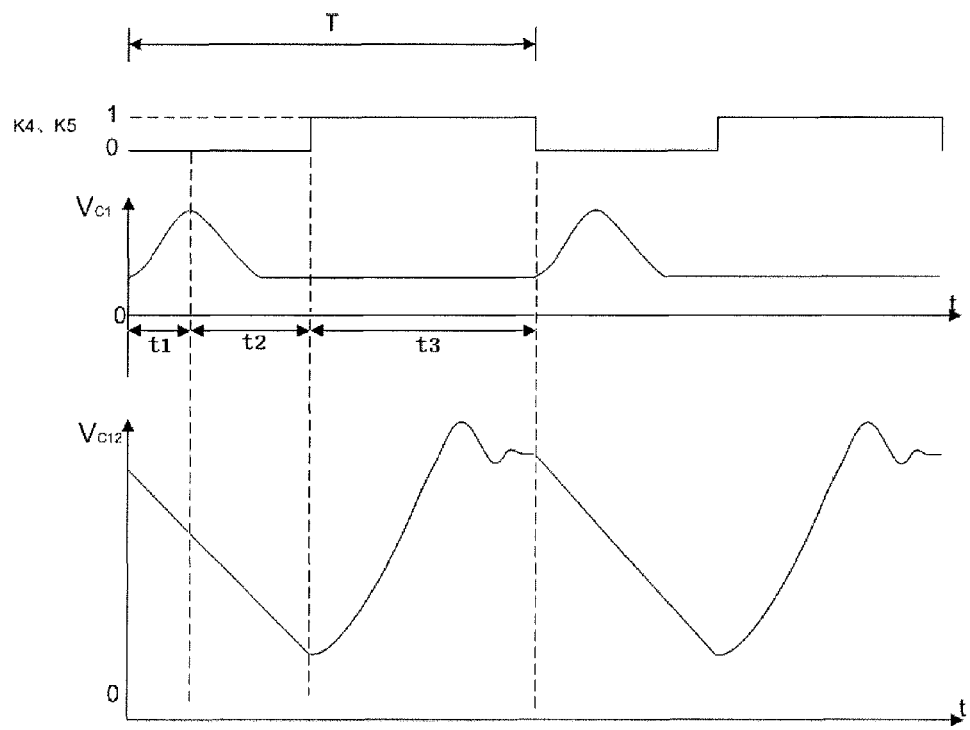
FIG. 8 shows schematic waveform charts of the heating circuit and a load capacitor in FIG. 7.

FIG. 8 shows schematic waveform charts of the heating circuit 11 and the load capacitor C12 in FIG. 7. In FIG. 8, T is a single working period of the electric running control system, $V_{C1}$ is a voltage of the charge storage element C1 in the heating circuit 11, $V_{C12}$ is a voltage of the load capacitor C12. The working process of the electric vehicle running control system in FIG. 7 during the single period T is as follows.

a) During the running of the electric vehicle, if the in-vehicle battery 5 needs to be heated, the heating circuit control module 100 controls the bidirectional switchgear 1 to switch on, and the heating circuit 11 is connected with the in-vehicle battery 5 to form a heating loop. The in-vehicle battery 5 discharges through the heating circuit 11, that is, the in-vehicle battery 5 charges the charge storage element C1 in the heating circuit 11. Meanwhile, the switch control module 200 controls the bidirectional switch K4 and the bidirectional switch K5 to switch off, so as that the in-vehicle battery 5 disconnects from the load capacitor C12. At this time, during the running of the electric vehicle, a remaining energy in the load capacitor C12 can be supplied to the vehicle load 6 to make it work for a short time, as a time period t1 shown in FIG. 8.

b) When the current in the heating loop comes back to zero from the forward peak current, the charge storage element C1 in the heating circuit 11 starts to charge the in-vehicle battery 5 through the heating loop. When the charge storage element C1 in the heating circuit 11 discharges to a lowest voltage, the heating circuit control module 100 controls the bidirectional switchgear 1 to switch off to make the heating circuit 11 disconnect from the in-vehicle battery 5, and thus the charge storage element C1 keeps the lowest voltage, as a time period t2 shown in FIG. 8.

c) When the energy in the load capacitor C12 is not enough to make the vehicle load 6 work, the switch control module 200 can control the bidirectional switch K4 and the bidirectional switch K5 to switch on so as to connect the in-vehicle battery 5 with the load capacitor C12. Then, the in-vehicle battery 5 can charge the load capacitor C12, and the vehicle load 6 can work with the energy provided by the load capacitor C12, as a time period t3 shown in FIG. 8.

With the electric vehicle running control system according to one embodiment of the present disclosure, when the in-vehicle battery is heated (that is, the heating loop formed by the heating circuit 11 and the load capacitor C12 is closed), the in-vehicle battery 5 can be disconnected from the load capacitor C12 by the switchgear 20, which stops the in-vehicle battery 5 from supplying energy to the load capacitor C12. Therefore, the heating circuit 11 and the load capacitor C12 may work at different times to avoid interfering each other.

During the above heating, when the current flows back to the in-vehicle battery 5 from the heating circuit 11, the energy in the charge storage element C1 will not totally flow back to the in-vehicle battery 5, and a part of the energy remains in the charge storage element C1, which finally makes the voltage of the charge storage element C1 approach or equal to that of the in-vehicle battery 5, and thus resulting in that the energy can not flow from the in-vehicle battery 5 to the charge storage element C1, which is disadvantageous for a cycle operation of the heating circuit 11.

Thus, in certain embodiments of the present disclosure, the system is further provided with additional units that sum the energy in the charge storage element C1 and the energy in the in-vehicle battery 5 and transfer the energy in the charge storage element C1 to other energy storage elements. At a certain time, the bidirectional switchgear 1 is switched off, and the energy in the charge storage element C1 is summed and/or transferred.

Figure 9:
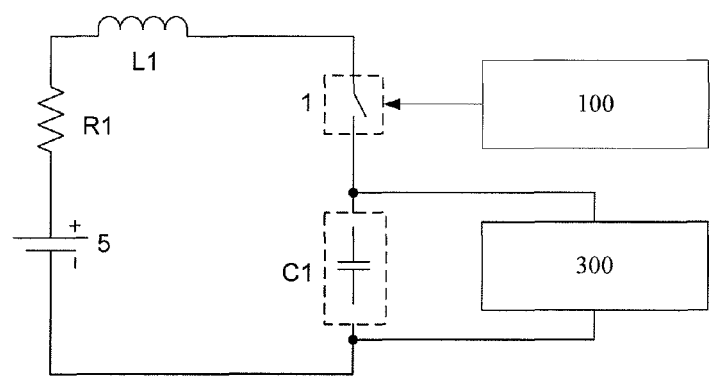
FIG. 9 is a schematic diagram of the electric vehicle running control system according to an embodiment of the present disclosure.

FIG. 9 is a schematic diagram of the electric vehicle running control system according to an embodiment of the present disclosure. As shown in FIG. 9, the heating circuit 11 further comprises an energy summing unit 300. The energy summing unit 300 is connected with a path formed with the current storage element L1 and the charge storage element C1, and is configured to sum the energy in the heating circuit 11 and the energy in the in-vehicle battery 5 after the bidirectional switchgear 1 is switched off from a switched-on state. The energy summing unit 300 makes the in-vehicle battery 5 able to charge the energy summed into the charge storage element C1 after the bidirectional switchgear 1 is switched on again, which increases a working efficiency of the heating circuit 11.

Figure 10:
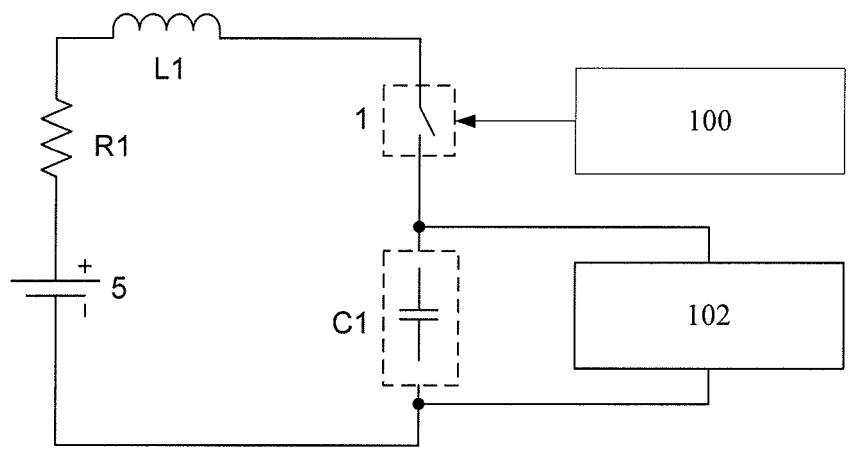
FIG. 10 is a schematic diagram of an embodiment of an energy summing unit in FIG.9.

FIG. 10 is a schematic diagram of an embodiment of the energy summing unit 300. As shown in FIG. 10, the energy summing unit 300 comprises a polarity reversing unit 102.

The polarity reversing unit 102 is connected with the path formed with the current storage element L1 and the charge storage element C1, and is configured to reverse a voltage polarity of the charge storage element C1 after the bidirectional switchgear 1 is switched off from the switched-on state. As the voltage polarity of the charge storage element C1 after polarity reversing and the voltage polarity of the in-vehicle battery 5 are serially summed up, when the bidirectional switchgear 1 is switched on again, the energy in the charge storage element C1 can be summed with the energy in the in-vehicle battery 5.

Figure 11:
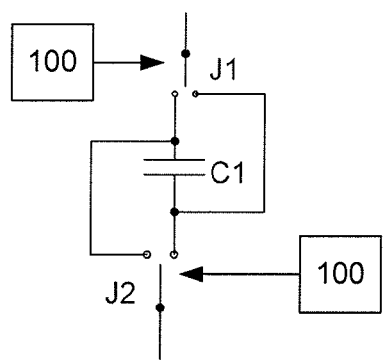
FIG. 11 is a schematic diagram of an embodiment of the polarity reversing unit in FIG.10.

FIG. 11 is a schematic diagram of an embodiment of the polarity reversing unit 102. As shown in FIG. 11, the polarity reversing unit 102 comprises a single-pole double-throw switch J1 and a single-pole double-throw switch J2. The single-pole double-throw switch J1 is located at both ends of the charge storage element C1. A lead-in wire of the single-pole double-throw switch J1 is connected in the heating circuit 11, a first lead-out wire of the single-pole double-throw switch J1 is connected with a first pole plate of the charge storage element C1, and a second lead-out wire of the single-pole double-throw switch J1 is connected with a second pole plate of the charge storage element C1. The single-pole double-throw switch J2 is located at both ends of the charge storage element C1. A lead-in wire of the single-pole double-throw switch J2 is connected in the heating circuit 11, a first lead-out wire of the single-pole double-throw switch J2 is connected with the second pole plate of the charge storage element C1, and a second lead-out wire of the single-pole double-throw switch J2 is connected with the first pole plate of the charge storage element C1. The heating circuit control module 100 is connected with the single-pole double-throw switch J1 and the single-pole double-throw switch J2 respectively, for reversing the voltage polarity of the charge storage element C1 by changing respective connection relations between the lead-in wire and the lead-out wires of the single-pole double-throw switch J1 and the single-pole double-throw switch J2.

According to the above embodiment, the respective connection relation between the lead-in wire and the lead-out wires of the single-pole double-throw switch J1 and the single-pole double-throw switch J2 can be preset in such a way: when the bidirectional switchgear 1 is switched on, the lead-in wire of the single-pole double-throw switch J1 is connected with the first lead-out wire of the single-pole double-throw switch J1, and the lead-in wire of the single-pole double-throw switch J2 is connected with the first lead-out wire of the single-pole double-throw switch J2; and when the bidirectional switchgear 1 is switched off, with the control of the heating circuit control module 100, the lead-in wire of the single-pole double-throw switch J1 is switched to connect with the second lead-out wire of the single-pole double-throw switch J1 and the lead-in wire of the single-pole double-throw switch J2 is switched to connect with the second lead-out wire of the single-pole double-throw switch J2. Thus, the voltage polarity reversing of the charge storage element C1 is achieved.

Figure 12:
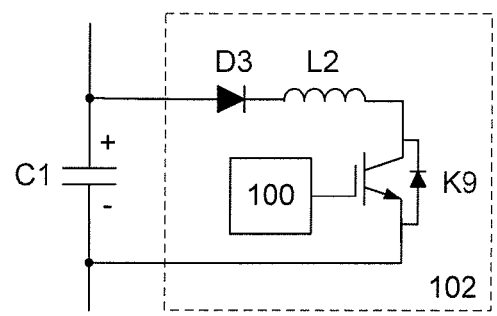
FIG. 12 is a schematic diagram of an embodiment of the polarity reversing unit in FIG.10.

FIG. 12 is a schematic diagram of another embodiment of the polarity reversing unit 102. As shown in FIG. 12, the polarity reversing unit 102 comprises a unidirectional semiconductor element D3, a current storage element L2 and a switch K9. The charge storage element C1, the current storage element L2 and the switch K9 are connected in series sequentially to form a loop. The unidirectional semiconductor element D3 is connected in series between the charge storage element C1 and the current storage element L2 or between the current storage element L2 and the switch K9. The heating circuit control module 100 is also connected with the switch K9, for reversing the voltage polarity of the charge storage element C1 by controlling the switch K9 to switch on.

According to the above embodiment, when the bidirectional switchgear 1 is switched off, the switch K9 is controlled to switch on by the heating circuit control module 100. Accordingly, the charge element C1 forms an LC oscillation loop with the unidirectional semiconductor element D3, the current storage element L2 and the switch K9. The charge element C1 discharges through the current storage element L2, and the voltage polarity reversing of the charge storage element C1 is achieved when the current in the oscillation loop comes back to zero after passing through a positive half period.

Figure 13:
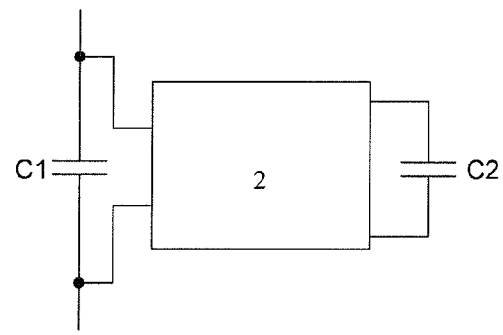
FIG. 13 is a schematic diagram of an embodiment of the polarity reversing unit in FIG.10.

FIG. 13 is a schematic diagram of yet another embodiment of the polarity reversing unit 102. As shown in FIG. 13, the polarity reversing unit 102 comprises a first DC-DC module 2 and a charge storage element C2. The first DC-DC module 2 is connected with the charge storage element C1 and the charge storage element C2 respectively. The heating circuit control module 100 is also connected with the first DC-DC module 2 for transferring the energy in the charge storage element C1 to the charge storage element C2, and then reversely transferring an energy in the charge storage element back C2 to the charge storage element C1, by controlling the first DC-DC module 2, so as to reverse the voltage polarity of the charge storage element C1.

The first DC-DC module 2 is a commonly used DC-DC (direct current to direct current) converting circuit for reversing the voltage polarity in the art. A circuit structure of the first DC-DC module 2 is not limited in the present disclosure. As long as the voltage polarity reversing of the charge storage element C1 can be achieved, a person skilled in the art can increase, replace or delete elements in the circuit according to actual requirements.

Figure 14:
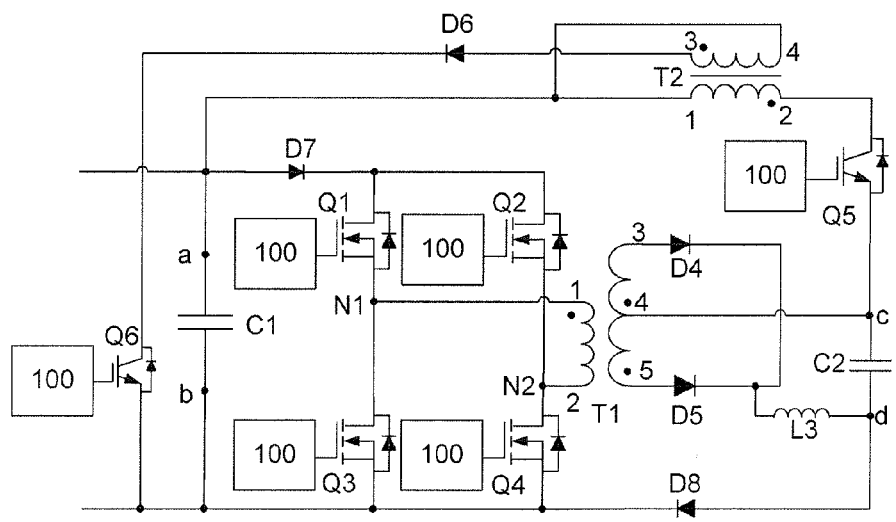
FIG. 14 is a schematic diagram of an embodiment of the first DC-DC module in FIG. 13.

FIG. 14 is a schematic diagram of an embodiment of the first DC-DC module 2. As shown in FIG. 14, the first DC-DC module 2 comprises a bidirectional switch Q1, a bidirectional switch Q2, a bidirectional switch Q3, a bidirectional switch Q4, a first transformer T1, a unidirectional semiconductor element D4, a unidirectional semiconductor element D5, a current storage element L3, a bidirectional switch Q5, a bidirectional switch Q6, a second transformer T2, a unidirectional semiconductor element D6, a unidirectional semiconductor element D7 and a unidirectional semiconductor element D8.

In the embodiment, all the bidirectional switch Q1, the bidirectional switch Q2, the bidirectional switch Q3 and the bidirectional switch Q4 are MOSFETs, and both the bidirectional switch Q5 and the bidirectional switch Q6 are IGBTs. A pin 1, a pin 4 and a pin 5 of the first transformer T1 are dotted terminals, and a pin 2 and a pin 3 of the second transformer T2 are dotted terminals.

An anode of the unidirectional semiconductor element D7 is connected with an end a of the capacitor C1, a cathode of the unidirectional semiconductor element D7 is connected with drains of the bidirectional switch Q1 and the bidirectional switch Q2 respectively, a source of the bidirectional switch Q1 is connected with a drain of the bidirectional switch Q3, a source of the bidirectional switch Q2 is connected with a drain of the bidirectional switch Q4, both the sources of the bidirectional switch Q3 and the bidirectional switch Q4 are connected with an end b of the capacitor C1, and thus a full bridge circuit is formed, in which the voltage polarity of the end a of the capacitor C1 is positive, and the voltage polarity of the end b is negative.

Further, in the full bridge circuit, the bidirectional switch Q1 and the bidirectional switch Q2 are upper bridge arms, the bidirectional switch Q3 and the bidirectional switch Q4 are lower bridge arms. The full bridge circuit is connected with the charge storage element C2 through the first transformer T1. The pin 1 of the first transformer T1 is connected with a first node N1, a pin 2 of the first transformer T1 is connected with a second node N2, a pin 3 and the pin 5 of the first transformer T1 are connected with anodes of the unidirectional semiconductor element D4 and the unidirectional semiconductor element D5 respectively. The cathodes of the unidirectional semiconductor element D4 and the unidirectional semiconductor element D5 are connected with one end of the current storage element L3, the other end of the current storage element L3 is connected with an end d of the charge storage element C2. The pin 4 of the first transformer T1 is connected with an end c of the charge storage element C2, the anode of the unidirectional semiconductor element D8 is connected with the end d of the charge storage element C2, and the cathode of the unidirectional semiconductor element D8 is connected with the end b of the charge storage element C1. At this time, the voltage polarity of the end c of the charge storage element C2 is negative, and the voltage polarity of the end d is positive.

In FIG. 14, the end c of the charge storage element C2 is connected with an emitter of the bidirectional switch Q5, a collector of the bidirectional switch Q5 is connected with the pin 2 of the second transformer T2, the pin 1 of the second transformer T2 is connected with the end a of the charge storage element C1, the pin 4 of the second transformer T2 is connected with the end a of the charge storage element C1, the pin 3 of the second transformer T2 is connected with the anode of the unidirectional semiconductor element D6, the cathode of the unidirectional semiconductor element D6 is connected with a collector of the bidirectional switch Q6, and an emitter of the bidirectional switch Q6 is connected with the end b of the charge storage element C2.

Further, the bidirectional switch Q1, the bidirectional switch Q2, the bidirectional switch Q3, the bidirectional switch Q4, the bidirectional switch Q5 and the bidirectional switch Q6 are controlled respectively by the heating circuit control module 100 to switch on or off.

In the following, a working process of the first DC-DC module 2 will be described.

1. After the bidirectional switchgear 1 is switched off, the heating circuit control module 100 controls the bidirectional switch Q5 and the bidirectional switch Q6 to switch off, controls the bidirectional switch Q1 and the bidirectional switch Q4 to switch on simultaneously so as to form a phase A, and controls the bidirectional switch Q2 and the bidirectional switch Q3 to switch on simultaneously so as to form a phase B. Then, the heating circuit control module 100 controls the phase A and the phase B to switch on alternately, so as to form the full bridge circuit.

2. When the full bridge circuit works, the energy in the charge storage element C1 is transferred to the charge storage element C2 through the first transformer T1, the unidirectional semiconductor element D4, the unidirectional semiconductor element D5 and the current storage element L3. At this time, the voltage polarity of the end c of the charge storage element C2 is negative, and the voltage polarity of the end d is positive.

3. The heating circuit control module 100 controls the bidirectional switch Q5 to switch on, and the charge storage element C1 forms a path with the charge storage element C2 through the second transformer T2 and the unidirectional semiconductor element D8. Thus, the energy in the charge storage element C2 is reversely transferred to the charge storage element C1, in which a part of the energy is stored in the second transformer T2. At this time, the heating circuit control module 100 controls the bidirectional switch Q5 to switch off and controls the bidirectional switch Q6 to switch on. Then, the energy stored in the second transformer T2 is transferred to the charge storage element C1 through the second transformer T2 and the unidirectional semiconductor element D6, so as to reversely charge the charge storage element C1. At this time, the voltage polarity of the end a of the charge storage element C1 is reversed to be negative, the voltage polarity of the end b of the charge storage element C1 is reversed to be positive. The voltage polarity reversing of the charge storage element C1 is achieved.

It should be understood by the person skilled in the art that, the above embodiments are not intended to limit methods for reversing the voltage polarity of the charge storage element C1. The person skilled in the art can use other structures to achieve the voltage polarity reversing of the charge storage element C1, such as a charge pump.

Figure 15:
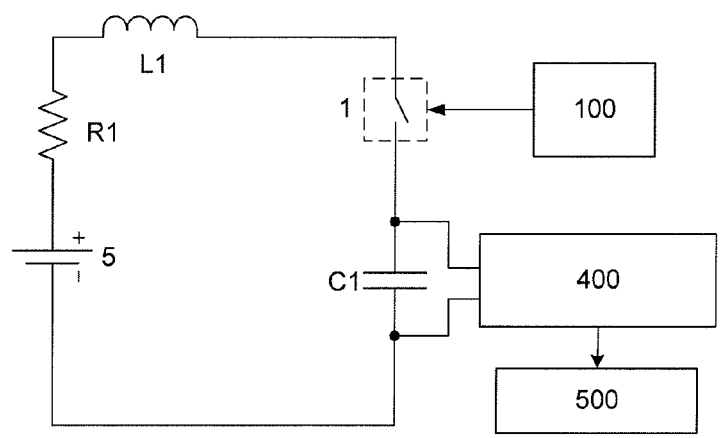
FIG. 15 is a schematic diagram of the electric vehicle running control system according to an embodiment of the present disclosure.

FIG. 15 is a schematic diagram of the electric vehicle running control system according to an embodiment of the present disclosure. As shown in FIG. 15, the system further comprises an energy transferring unit 400. The energy transferring unit is connected with a path formed with the current storage element L1 and the charge storage element C1. The energy transferring unit 400 is configured to transfer the energy in the heating circuit 11 to an energy storage element 500 after the bidirectional switchgear 1 is switched off from the switched-on state. The energy transferring unit 400 is used to recycle the energy in the heating circuit. The energy storage element 500 may be an external capacitor, a low temperature battery, a power grid or any other electric equipment.

Figure 16:
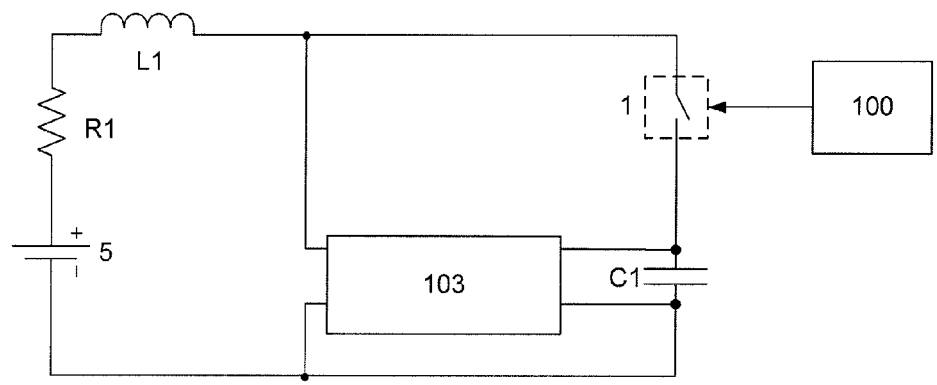
FIG. 16 is a schematic diagram of an embodiment of the energy transferring unit in FIG. 15.

The energy storage element 500 may be the in-vehicle battery 5, and the energy transferring unit 400 comprises an electric power recharging unit 103. The electric power recharging unit 103 is connected with the path formed with the current storage element L1 and the charge storage element C1, for transferring the energy in the heating circuit 11 to the in-vehicle battery 5 after the bidirectional switchgear 1 is switched off from the switched-on state, as shown in FIG. 16.

According to the present disclosure, when the energy in the heating circuit 11 is transferred to the in-vehicle battery 5 by the electric power recharging unit 103 after the bidirectional switchgear 1 is switched off, the energy transferred can be used circularly after the bidirectional switchgear 1 is switched on again, which increases the working efficiency of the heating circuit 11.

Figure 17:
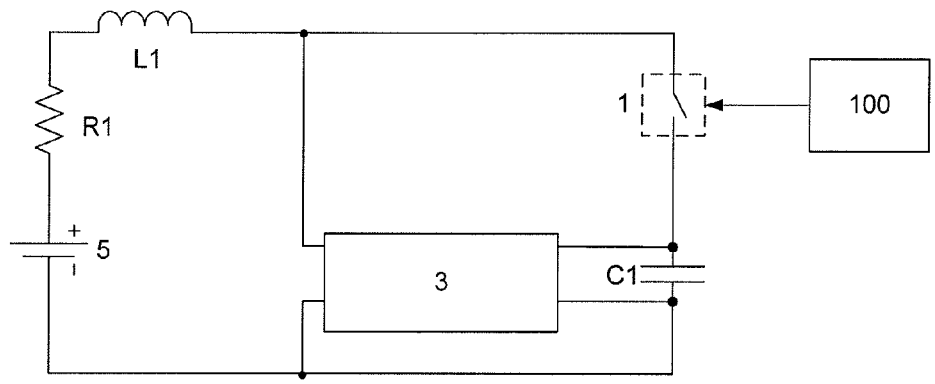
FIG. 17 is a schematic diagram of an embodiment of the electric power recharging unit in FIG. 16.

FIG. 17 is a schematic diagram of an embodiment of the electric power recharging unit 103. As shown in FIG. 17, the electric power recharging unit 103 comprises a second DC-DC module 3. The second DC-DC module 3 is connected with the charge storage element C1 and the in-vehicle battery 5 respectively. The heating circuit control module 100 is also connected with the second DC-DC module 3, for transferring the energy in the charge storage element C1 to the in-vehicle battery 5 by controlling the second DC-DC module 3.

The second DC-DC module 3 is a commonly used DC-DC converting circuit for transferring the energy in the art. A circuit structure of the second DC-DC module 3 is not limited in the present disclosure. As long as the energy transferring of the charge storage element C1 can be achieved, a person skilled in the art can increase, replace or delete the elements in the circuit according to actual requirements.

Figure 18:
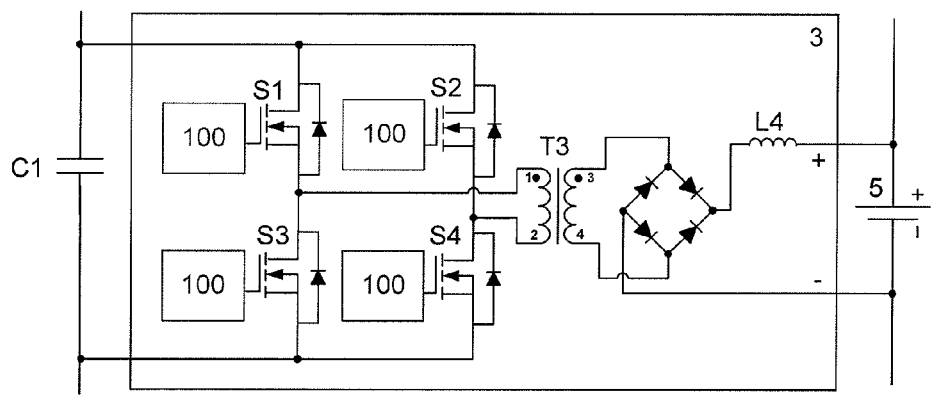
FIG. 18 is a schematic diagram of an embodiment of the second DC-DC module in FIG. 17.

FIG. 18 is a schematic diagram of an embodiment of the second DC-DC module 3. As shown in FIG. 18, the second DC-DC module 3 comprises a bidirectional switch S1, a bidirectional switch S2, a bidirectional switch S3, a bidirectional switch S4, a third transformer T3, a current storage element L4 and four unidirectional semiconductor elements. In the embodiment, all the bidirectional switch S1, the bidirectional switch S2, the bidirectional switch S3 and the bidirectional switch S4 are MOSFETs.

A pin 1 and a pin 3 of the third transformer T3 are dotted terminals. The cathodes of two unidirectional semiconductor elements of the four unidirectional semiconductor elements are connected to form a group, and a connection point thereof is connected with the positive electrode of the in-vehicle battery 5 through the current storage element L4. The anodes of the other two unidirectional semiconductor elements are connected to form another group, and a connection point thereof is connected with the negative electrode of the in-vehicle battery 5. Junction points between the two groups are connected with the pin 3 and the pin 4 of the third transformer T3 respectively. Thus, a bridge rectifier circuit is formed.

Further, a source of the bidirectional switch S1 is connected with a drain of the bidirectional switch S3, a source of the bidirectional switch S2 is connected with a drain of the bidirectional switch S4, the drains of the bidirectional switch S1 and the bidirectional switch S2 are connected with the positive end of the charge storage element C1, and the sources of the bidirectional switch S3 and the bidirectional switch S4 are connected with the negative end of the charge storage element C1. Thus, a full bridge circuit is formed.

In the full bridge circuit, the bidirectional switch S1 and the bidirectional switch S2 are upper bridge arms, the bidirectional switch S3 and the bidirectional switch S4 are lower bridge arms. The pin 1 of the third transformer T3 is connected with a node between the bidirectional switch S1 and the bidirectional switch S3, a pin 2 of the third transformer T3 is connected with a node between the bidirectional switch S2 and the bidirectional switch S4.

Further, the bidirectional switch S1, the bidirectional switch S2, the bidirectional switch S3 and the bidirectional switch S4 are controlled respectively by the heating circuit control module 100 to switch on or off.

In the following, the working process of the second DC-DC module 3 will be described.

1. After the bidirectional switchgear 1 is switched off, the heating circuit control module 100 controls the bidirectional switch S1 and the bidirectional switch S4 to switch on simultaneously so as to form a phase A, and controls the bidirectional switch S2 and the bidirectional switch S3 to switch on simultaneously so as to form a phase B. Then, the heating circuit control module 100 controls the phase A and the phase B to switch on alternately, so as to form the full bridge circuit to work.

2. When the full bridge circuit works, the energy in the charge storage element C1 is transferred to the in-vehicle battery 5 through the third transformer T3 and the rectifier circuit, in which the rectifier circuit converts an input alternating current into a direct current and then output the direct current to the in-vehicle battery 5, so as to achieve the electric power recharging.

It should be understood by the person skilled in the art that, the above embodiments are not intended to limit methods for transferring the energy in the heating circuit 11 to the element storage elements. The person skilled in the art can use other structures to transfer the energy in the heating circuit 11, such as a charge pump or a transformer.

Figure 19:
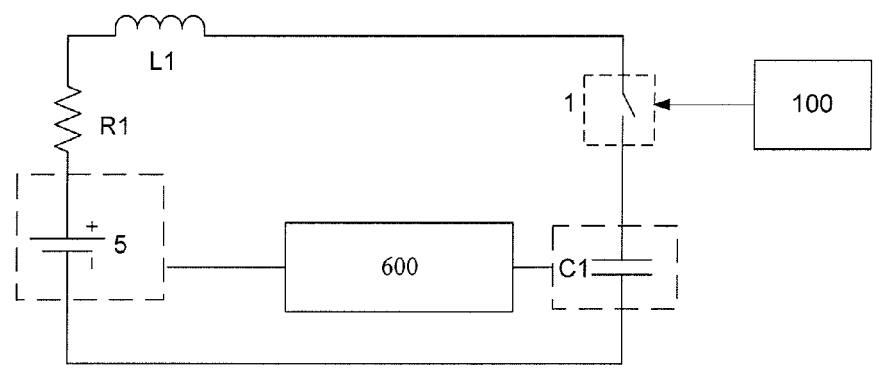
FIG. 19 is a schematic diagram of the electric vehicle running control system according to an embodiment of the present disclosure.

FIG. 19 is a schematic diagram of the electric vehicle running control system according to an embodiment of the present disclosure. As shown in FIG. 19, the system further comprises an energy summing and transferring unit 600. The energy summing and transferring unit 600 is connected with the path formed with the current storage element L1 and the charge storage element C1, for transferring a part of the energy in the heating circuit 11 to the energy storage element 500 after the bidirectional switchgear 1 is switched off from the switched-on state, and then summing a remaining energy in the heating circuit 11 and the energy in the in-vehicle battery 5. The energy summing and transferring unit 600 may not only increase the working efficiency of the heating circuit 11, but also recycle the energy in the heating circuit 11.

The summing the remaining energy in the heating circuit 11 and the energy in the in-vehicle battery 5 is achieved by reversing the voltage polarity of the charge storage element C1. As the voltage polarity of the charge storage element C1 after reversing and the voltage polarity of the in-vehicle battery 5 are serially summed up, when the bidirectional switchgear 1 is switched on again, the energy in the in-vehicle battery 5 can be summed with the energy in the charge storage element C1.

Figure 20:
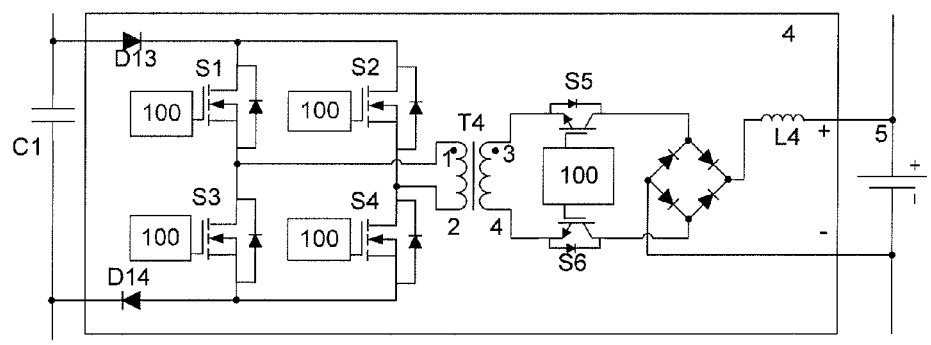
FIG. 20 is a schematic diagram of an embodiment of the energy summing and transferring unit in FIG. 19.

FIG. 20 is a schematic diagram of an embodiment of the energy summing and transferring unit 600. As shown in FIG. 20, the energy summing and transferring unit 600 comprises a third DC-DC module 4. The third DC-DC module 4 is connected with the charge storage element C1 and the in-vehicle battery 5 respectively. The heating circuit control module 100 is also connected with the third DC-DC module 4 for transferring a part of the energy in the charge storage element C1 to the energy storage element 500, and then summing a remaining energy in the charge storage element C1 and the energy in the in-vehicle battery 5, by controlling the third DC-DC module 4.

The third DC-DC module 4 is a commonly used DC-DC converting circuit for transferring the energy and reversing the voltage polarity in the art. A circuit structure of the third DC-DC module 4 is not limited in the present disclosure. As long as the energy transferring and voltage polarity reversing of the charge storage element C1 can be achieved, a person skilled in the art can increase, replace or delete the elements in the circuit according to actual requirements.

As shown in FIG. 20, the third DC-DC module 4 comprises a bidirectional switch S1, a bidirectional switch S2, a bidirectional switch S3, a bidirectional switch S4, a bidirectional switch S5, a bidirectional switch S6, a fourth transformer T4, a unidirectional semiconductor element D13, a unidirectional semiconductor element D14, a current storage element L4 and other four unidirectional semiconductor elements. In the embodiment, the bidirectional switch S1, the bidirectional switch S2, the bidirectional switch S3 and the bidirectional switch S4 are MOSFETs, and the bidirectional switch S5 and the bidirectional switch S6 are IGBTs.

A pin 1 and a pin 3 of the fourth transformer T4 are dotted terminals. The cathodes of two unidirectional semiconductor elements of the four unidirectional semiconductor elements are connected to form a group, and a connection point thereof is connected with the positive electrode of the in-vehicle battery 5 through the current storage element L4. The anodes of the other two unidirectional semiconductor elements are connected to form another group, and the connection point thereof is connected with the negative electrode of the in-vehicle battery 5. Junction points between the two groups are connected with the pin 3 and the pin 4 of the third transformer T3 respectively through the bidirectional switch S5 and the bidirectional switch S6. Thus, a bridge rectifier circuit is formed.

Further, a source of the bidirectional switch 51 is connected with a drain of the bidirectional switch S3, a source of the bidirectional switch S2 is connected with a drain of the bidirectional switch S4, the drains of the bidirectional switch S1 and the bidirectional switch S2 are connected with the positive end of the charge storage element C1 through the unidirectional semiconductor element D13, and the sources of the bidirectional switch S3 and the bidirectional switch S4 are connected with the negative end of the charge storage element C1 through the unidirectional semiconductor element D14. Thus, a full bridge circuit is formed.

In the full bridge circuit, the bidirectional switch S1 and the bidirectional switch S2 are upper bridge arms, the bidirectional switch S3 and the bidirectional switch S4 are lower bridge arms. The pin 1 of the fourth transformer T4 is connected with a node between the bidirectional switch S1 and the bidirectional switch S3, a pin 2 of the fourth transformer T4 is connected with a node between the bidirectional switch S2 and the bidirectional switch S4.

Further, the bidirectional switch S1, the bidirectional switch S2, the bidirectional switch S3, the bidirectional switch S4, the bidirectional switch S5 and the bidirectional switch S6 are controlled respectively by the heating circuit control module 100 to switch on or off.

In the following, the working process of the third DC-DC module 4 will be described.

1. After the bidirectional switchgear 1 is switched off, when the electric power recharging to the charge storage element C1 is needed to achieve energy transferring, the heating circuit control module 100 controls the bidirectional switch S5 and the bidirectional switch S6 to switch on, controls the bidirectional switch S1 and the bidirectional switch S4 to switch on simultaneously so as to form a phase A, and controls the bidirectional switch S2 and the bidirectional switch S3 to switch on simultaneously so as to form a phase B. Then, the heating circuit control module 100 controls the phase A and the phase B to switch on alternately, so as to form the full bridge circuit to work.

2. When the full bridge circuit works, the energy in the charge storage element C1 is transferred to the in-vehicle battery 5 through the fourth transformer T4 and the rectifier circuit, in which the rectifier circuit converts the input alternating current into the direct current and then output the direct current to the in-vehicle battery 5 so as to achieve the electric power recharging.

3. When the polarity of the charge storage element C1 needs to be reversed so as to achieve the energy summing, the heating circuit control module 100 controls the bidirectional switch S5 and the bidirectional switch S6 to switch off, and controls the bidirectional switch S1 and the bidirectional switch S4 to switch on (otherwise, controls the bidirectional switch S2 and the bidirectional switch S3 to switch on). At this time, the energy in the charge storage element C1 flows reversely back to the negative end thereof through the positive end thereof, the bidirectional switch S1, a primary side of the fourth transformer T4 and the bidirectional switch S4, or the energy in the charge storage element C1 flows reversely back to the negative end thereof through the positive end thereof, the bidirectional switch S2, the primary side of the fourth transformer T4 and the bidirectional switch S3, in which the voltage polarity of the charge storage element C1 is reversed by a magnetic inductance of the primary side of the fourth transformer T4.

In another embodiment, the energy summing and transferring unit 600 may comprise the energy summing unit and the energy transferring unit. The energy transferring unit is connected with the path formed with the current storage element L1 and the charge storage element C1 for transferring a part of the energy in the heating circuit 11 to the energy storage element 500 after the bidirectional switchgear 1 is switched off from the switched-on state. The energy summing unit is also connected with the path formed with the current storage element L1 and the charge storage element C1 for summing the remaining energy in the heating circuit 11 and the energy in the in-vehicle battery 5 after the energy transferring is conducted by the energy transferring unit.

It should be noted that, any energy summing unit 300 and energy transferring unit 400 described in the above embodiments may be used herein to transfer and sum the energy in the charge storage element C1.

It should be understood by the person skilled in the art that the above embodiments are not intended to limit methods for transferring and then summing the energy in the heating circuit 11. The person skilled in the art can use other structures to transfer and sum the energy in the heating circuit 11, such as a charge pump.

According to another embodiment of the present disclosure, the system may further comprise an energy limiting circuit for limiting a current flowing from the heating circuit 11 to the in-vehicle battery 5. The bidirectional switchgear 1 may comprise a first unidirectional branch for realizing a flowing of the energy from the in-vehicle battery 5 to the heating circuit 11 and a second unidirectional branch for realizing a flowing of the energy from the heating circuit 11 to the in-vehicle battery 5. The heating circuit control module 100 is connected with the first unidirectional branch and/or the second unidirectional branch for controlling the first unidirectional branch and/or the second unidirectional branch connected to be on or off. Further, the energy limiting circuit may comprise a current storage element L111. The current storage element L111 is connected in series in the second unidirectional branch for limiting the current flowing to the in-vehicle battery 5.

Figure 21:
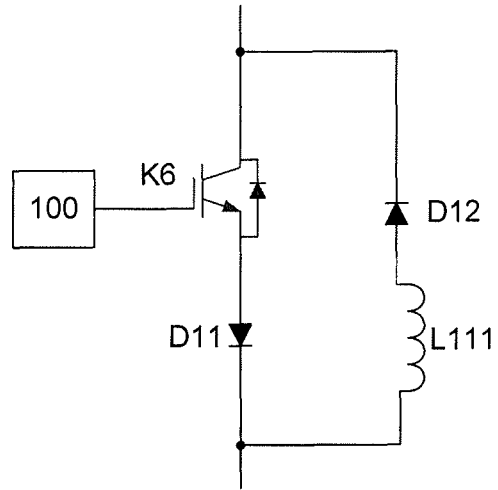
FIG. 21 is a schematic diagram of an embodiment of the heating circuit in the electric vehicle running control system according to the present disclosure.

FIG. 21 is a schematic diagram of an embodiment of the bidirectional switchgear 1. As shown in FIG. 21, the bidirectional switchgear 1 comprises a switch K6, a unidirectional semiconductor element D11 and a unidirectional semiconductor element D12. The switch K6 and the unidirectional semiconductor element D11 are connected in series to form the first unidirectional branch, the unidirectional semiconductor element D12 forms the second unidirectional branch. The heating circuit control module 100 is connected with the switch K6 for controlling the first unidirectional branch to be on or off by controlling the switch K6 to switch on or off, and the current storage element L111 is connected with the unidirectional semiconductor element D12 in series. In the bidirectional switchgear shown in FIG. 21, the heating is stated only by switching on the switch K6, and the heating is stopped only by switching off the switch K6.

Although the bidirectional switchgear 1 in FIG. 21 realizes the energy flowing forward and reversely along relatively independent branches, it can not realize switching off the reversely flowing energy. To this end, the present disclosure provides another embodiment of the bidirectional switchgear 1.

Figure 22:
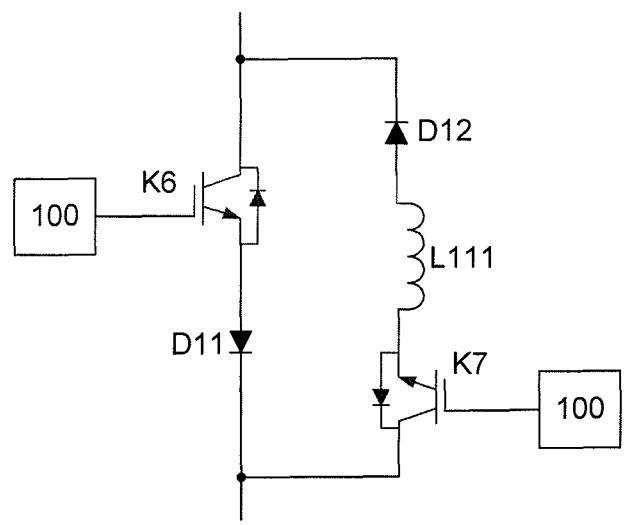
FIG. 22 is a schematic diagram of an embodiment of the heating circuit in the electric vehicle running control system according to the present disclosure.

FIG. 22 is a schematic diagram of another embodiment of the bidirectional switchgear 1. As shown in FIG. 22, the bidirectional switchgear 1 may further comprise a switch K7 in the second unidirectional branch. The switch K7 is connected with the unidirectional semiconductor element D12 in series. The heating circuit control module 100 is also connected with the switch K7 for controlling the second unidirectional branch to be on or off by controlling the switch K7 to switch on or off. Thus, as there are switches (i.e. the switch K6 and the switch K7) in both of the two unidirectional branches, the bidirectional switchgear 1 in FIG. 22 can switch off both the forward flowing and the reversely flowing of the energy.

In FIG. 22, the current storage element L111 is connected in series between the unidirectional semiconductor element D12 and the switch K7, so as to limit the current flowing to the in-vehicle battery 5.

According to embodiments of the present disclosure, when the in-vehicle battery needs to be heated, the heating circuit control module 100 controls the bidirectional switchgear 1 to switch on, the in-vehicle battery 5 is connected with the heating circuit 11 to form the loop, and the charge storage element C1 is charged by the in-vehicle battery 5. When the current in the loop comes back to zero from the forward peak current, the charge storage element C1 starts to discharge, and the current flows back to the in-vehicle battery 5 from the charge storage element C1. Both the forward current and the reverse current in the loop flow through the damping element R1, and then the in-vehicle battery 5 is heated by the heating of the damping element R1. The above charging and discharging are implemented circularly. When the temperature of the in-vehicle battery 5 reaches the stopping heating condition, the heating circuit control module 100 controls the bidirectional switchgear 1 to switch off so as to make the heating circuit 11 stop working.

In order to save elements and reduce a size of the heating circuit 11, in an embodiment, the current storage element L111 may also be included in the polarity reversing unit 102, so as to limit the current flowing from the heating circuit 11 to the in-vehicle battery 5 when the voltage polarity of the charge storage element C1 is reversed.

Figure 23:
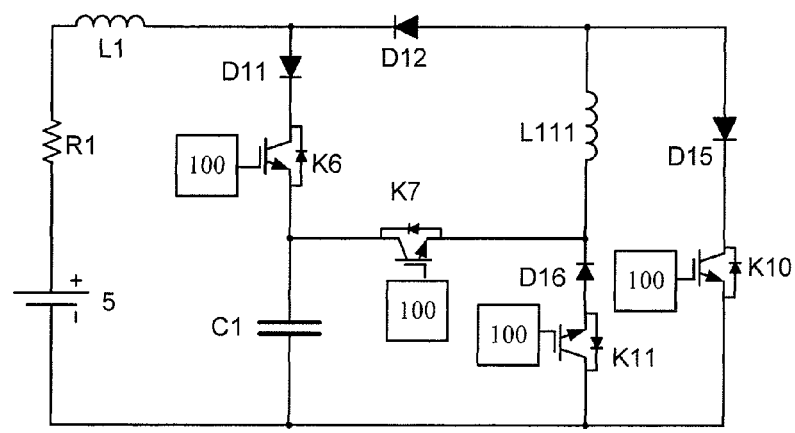
FIG. 23 is a schematic diagram of an embodiment of the heating circuit in the electric vehicle running control system according to the present disclosure.

FIG. 23 is a schematic diagram of the heating circuit 11 according to an embodiment of the present disclosure. As shown in FIG. 23, the bidirectional switchgear 1 may use the structure of the bidirectional switchgear in FIG. 21, the current storage element L111 is connected in series between the unidirectional semiconductor element D12 and the switch K7 in the second unidirectional branch of the bidirectional switchgear 1. The heating circuit 11 further comprises a unidirectional semiconductor element D15, a unidirectional semiconductor element D16, a switch K10, and a switch K11. A cathode of the unidirectional semiconductor element D16 is connected between the switch K7 and the current storage element L111, an anode of the unidirectional semiconductor element D16 is connected to one end of the switch K11, and the other end of the switch K11 is connected to a negative electrode of the in-vehicle battery 5. An anode of the unidirectional semiconductor element D15 is connected between the unidirectional semiconductor element D12 and the current storage element L111, a cathode of the unidirectional semiconductor element D15 is connected to one end of the switch K10, and the other end of the switch K10 is connected to the negative electrode of the in-vehicle battery 5. The heating circuit control module 100 is also connected with the switch K10 and the switch K11 respectively for controlling the switch K10 and the switch K11 to switch on or off.

In one embodiment, the heating circuit control module 100 may control the switch K6, the switch K7, the switch K10 and the switch K11 by many different on-off strategies, as long as the on-off strategy can both realize the energy flowing between the in-vehicle battery 5 and the charge storage element C1 and reverse the voltage polarity of the charge storage element C1.

For example, in one embodiment, when the in-vehicle battery needs to be heated, the heating circuit control module 100 controls the switch K6 and the switch K7 to switch on to enable the energy to flow from the in-vehicle battery 5 to the charge storage element C1 and then to flow from the charge storage element C1 to the in-vehicle battery 5 (in which, the switch K6 and the switch K7 may be switched on simultaneously, or the switch K7 may be switched on after the switch K6 is switched off). When a voltage applied to the charge storage element C1 is greater than a first predetermined voltage of the in-vehicle battery 5, the heating circuit controlling module 100 switches off the switch K7, switches on the switch K11, and then switches off the switch K11 until a current flowing through the current storage element L111 is zero. And the heating circuit control module 100 switches on the switch K7 and the switch K10 to enable the voltage polarity of the charge storage element C1 to reverse.

In another example, when the in-vehicle battery 5 needs to be heated, the heating circuit control module 100 controls the switch K6 and the switch K7 to switch on to enable the energy to flow from the in-vehicle battery 5 to the charge storage element C1 and then to flow from the charge storage element C1 to the in-vehicle battery 5. When a voltage applied to the charge storage element C1 is less than or equal to a second predetermined voltage of the in-vehicle battery 5, the heating circuit control module 100 switches off the switch K7 and switches on the switch K11. When a current flowing through the current storage element L111 reaches a second predetermined current, the heating circuit control module 100 switches off the switch K11 and switches on the switch K7 and the switch K10. When the current flowing through the current storage element L111 reaches a first predetermined current, the heating circuit control module 100 switches off the switch K10 to enable an energy in the current storage element L111 to flow to the in-vehicle battery 5. When the current flowing through the current storage element L111 is zero, the heating circuit control module 100 switches on the switch K7 and the switch K10 to enable the voltage polarity of the charge storage element C1 to reverse.

In the following, the working process of the electric vehicle running control system including the energy summing unit 300 will be described with reference to FIG. 24 and FIG. 25.

Figure 24:
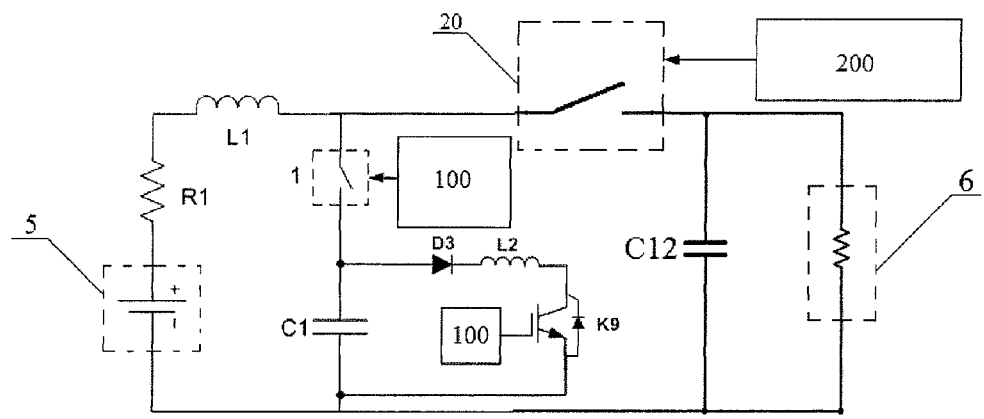
FIG. 24 is a schematic diagram of the electric vehicle running control system according to an embodiment of the present disclosure.

In the electric vehicle running control system shown in FIG. 24, the heating circuit 11 comprises the damping element R1, the bidirectional switchgear 1, the current storage element L1 and the charge storage element C1 connected in series. The heating circuit 11 is connected with the in-vehicle battery 5 to form a heating loop. The load capacitor C12 is connected with the vehicle load 6 in parallel for providing energy to the vehicle load 6. The heating circuit control module 100 is connected with the bidirectional switchgear 1 for controlling the heating circuit 11 to connect with or disconnect from the in-vehicle battery 5 by controlling the bidirectional switchgear 1 to switch on or off. The switchgear 20 comprises the bidirectional switch K4 and the bidirectional switch K5 connected in reverse series. The switch control module 200 is connected with the bidirectional switch K4 and the bidirectional switch K5 respectively for controlling the in-vehicle battery 5 to disconnect from the load capacitor C12 by controlling the bidirectional switch K4 and the bidirectional switch K5 to switch off. The unidirectional semiconductor element D3, the current storage element L2 and the switch K9 form the polarity reversing unit 102. The heating circuit control module 100 can control the switch K9 to switch on and off.

Figure 25:
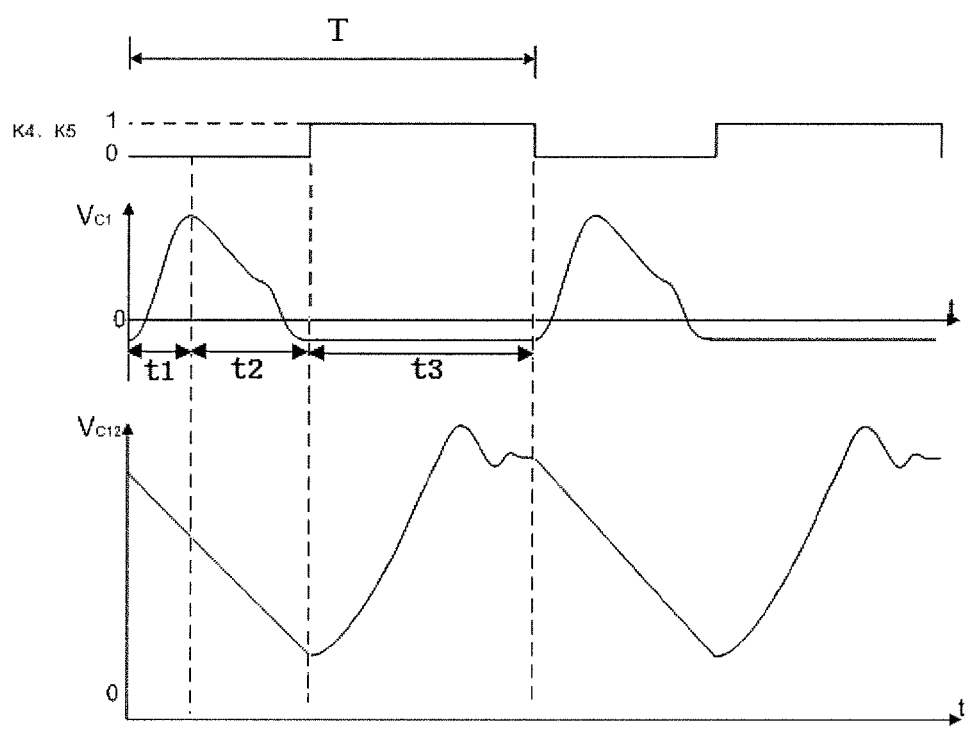
FIG. 25 shows schematic waveform charts of the heating circuit and the load capacitor in FIG. 24.

FIG. 25 shows schematic waveform charts of the heating circuit 11 and the load capacitor C2 in FIG. 21, in which T is a single working period of the electric vehicle running control system, $V_{C1}$ is the voltage of the charge storage element C1 in the heating circuit 11, and $V_{C12}$ is the voltage of the load capacitor C12. The working process of the electric vehicle running control system in FIG. 24 during the period T is as follows.

a) During the running of the electric vehicle, if the in-vehicle battery 5 needs to be heated, the heating circuit control module 100 controls the bidirectional switchgear 1 to switch on, and the heating circuit 11 is connected with the in-vehicle battery 5 to form a heating loop. The in-vehicle battery 5 discharges through the heating circuit 11, that is, the in-vehicle battery 5 charges the first charge storage element C1 in the heating circuit 11. Meanwhile, the switch control module 200 controls the bidirectional switch K4 and the bidirectional switch K5 to switch off, so as that the in-vehicle battery 5 disconnects from the load capacitor C12. At this time, during the running of the electric vehicle, the remaining energy in the load capacitor C12 can be supplied to the vehicle load 6 to make it work for a short time, as a time period t1 shown in FIG. 25.

b) When the current in the heating loop comes back to zero from the forward peak current, the charge storage element C1 in the heating circuit 11 starts to charge the in-vehicle battery 5 through the heating loop. When the charge storage element C1 in the heating circuit 11 discharges to a lowest voltage, the heating circuit control module 100 controls the bidirectional switchgear 1 to switch off to make the heating circuit 11 disconnect from the in-vehicle battery 5. Meanwhile, the heating circuit control module 100 controls the switch K9 to switch on to make the polarity reversing unit 102 work. Then, the charge storage element C1 discharges through the loop formed with the unidirectional semiconductor element D3, the current storage element L3 and the switch K9 to achieve the voltage polarity reversing. At this time, the voltage $V_{C1}$ of the charge storage element C1 falls down to a negative value, and then the heating circuit control module 100 controls the switch K9 to switch off, as a time period t2 shown in FIG. 25.

c) When the energy in the load capacitor C12 is not enough to make the vehicle load 6 work, the switch control module 200 controls the bidirectional switch K4 and the bidirectional switch K5 to switch on to connect the in-vehicle battery 5 with the load capacitor C12. Then, the in-vehicle battery 5 can charges the load capacitor C12, and the vehicle load 6 can work with the energy provided by the load capacitor C12, as a time period t3 shown in FIG. 25.

With the above electric vehicle running control system including the energy summing unit 300, during the heating of the electric vehicle (that is, the heating loop formed with the heating circuit 11 and the in-vehicle battery 5 is closed), the in-vehicle battery 5 can be disconnected from the load capacitor C12 by the switchgear 20, which stops the in-vehicle battery 5 from supplying energy to the load capacitor C12. Thus, the heating circuit 11 and the load capacitor C12 can work at different times to avoid interfering each other.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

The invention claimed is:

1. An electric vehicle running control system, comprising:
   a heating circuit;
   a load capacitor;
   a switchgear connected with the heating circuit and the load capacitor respectively; and
   a switch control module connected with the switchgear for controlling the switchgear to switch off when the heating circuit is connected with an in-vehicle battery to form a heating loop for heating the in-vehicle battery;
   wherein the heating circuit comprises a damping element, a bidirectional switchgear, a first current storage element and a first charge storage element, the damping element and the first current storage element are connected in series to form a first part, the bidirectional switchgear and the first charge storage element are connected in series to form a second part, one end of the first part is connected with a positive electrode of the in-vehicle battery, another end of the first part is connected with one end of the second part and one end of the switchgear respectively, and another end of the second part is connected with the load capacitor and a negative electrode of the in-vehicle battery; and wherein
   the bidirectional switchgear comprises a first unidirectional branch for realizing a flowing of an energy from the in-vehicle battery to the heating circuit, and a second unidirectional branch for realizing a flowing of an energy from the heating circuit to the in-vehicle battery;
   the electric vehicle running control system further comprising a heating circuit control module configured for controlling the heating circuit to connect with or disconnect from the in-vehicle battery by controlling the bidirectional switchgear to switch on or off, and
   the heating circuit control module is connected with the first unidirectional branch and/or the second unidirectional branch for controlling the first unidirectional branch and/or the second unidirectional branch connected to be on or off.

2. The electric vehicle running control system according to claim 1, wherein when the heating circuit is disconnected from the in-vehicle battery, the switch control module controls the switchgear to switch on and the in-vehicle battery charges the load capacitor.

3. The electric vehicle running control system according to claim 1, further comprising:
   a heating circuit control module configured for controlling the heating circuit to connect with or disconnect from the in-vehicle battery by controlling the bidirectional switchgear to switch on or off.

4. The electric vehicle running control system according to claim 3, wherein the heating circuit control module is integrated together with the switch control module.

5. The electric vehicle running control system according to claim 1, wherein the damping element is an internal parasitic resistor of the in-vehicle battery, and the first current storage element is an internal parasitic inductor of the in-vehicle battery.

6. The electric vehicle running control system according to claim 1, wherein the damping element is a resistor, the first current storage element is an inductor, and the first charge storage element is a capacitor.

7. The electric vehicle running control system according to claim 1, wherein the switchgear is a first bidirectional switch.

8. The electric vehicle running control system according to claim 7, wherein the switchgear comprises a second bidirectional switch and a third bidirectional switch connected in reverse series, and the switch control module is connected with the second bidirectional switch and the third bidirectional switch respectively.

9. The electric vehicle running control system according to claim 1, wherein the heating circuit further comprises an energy summing unit for summing an energy in the heating circuit and an energy in the in-vehicle battery after the bidirectional switchgear is switched off from a switched-on state, and the energy summing unit comprises a polarity reversing unit for reversing a voltage polarity of the first charge storage element after the bidirectional switchgear is switched off from the switched-on state.

10. The electric vehicle running control system according to claim 1, wherein the heating circuit further comprises an energy transferring unit for transferring an energy in the heating circuit to an energy storage element after the bidirectional switchgear is switched off from a switched-on state, and the energy transferring unit comprises an electric power recharging unit for transferring the energy in the heating circuit to the energy storage element after the bidirectional switchgear is switched off from the switched-on state.

11. The electric vehicle running control system according to claim 1, wherein the heating circuit further comprises an energy summing and transferring unit for transferring a part of an energy in the heating circuit to an energy storage element after the bidirectional switchgear is switched off from a switched-on state, and then summing a remaining energy in the heating circuit and an energy in the in-vehicle battery.

12. The electric vehicle running control system according to claim 11, wherein
the energy summing and transferring unit comprises an energy summing unit and an energy transferring unit,
the energy transferring unit is configured for transferring the part of the energy in the heating circuit to the energy storage element after the bidirectional switchgear is switched off from the switched-on state,
the energy summing unit is configured for summing the remaining energy in the heating circuit and the energy in the in-vehicle battery after the part of the energy is transferred by the energy transferring unit,
the energy transferring unit comprises an electric power recharging unit for transferring the part of the energy in the heating circuit to the energy storage element after the bidirectional switchgear is switched off from the switched-on state, and
the energy summing unit comprises a polarity reversing unit for reversing the voltage polarity of the first charge storage element after the part of the energy is transferred by the electric power recharging unit.

13. The electric vehicle running control system according to claim 9, wherein
the polarity reversing unit comprises: a first single-pole double-throw switch located at both ends of the first charge storage element and a second single-pole double-throw switch located at both ends of the first charge storage element,
a lead-in wire of the first single-pole double-throw switch is connected in the heating circuit, a first lead-out wire of the first single-pole double-throw switch is connected with a first pole plate of the first charge storage element, a second lead-out wire of the first single-pole double-throw switch is connected with a second pole plate of the first charge storage element,
a lead-in wire of the second single-pole double-throw switch is connected in the heating circuit, a first lead-out wire of the second single-pole double-throw switch is connected with the second pole plate of the first charge storage element, a second lead-out wire of the second single-pole double-throw switch is connected with the first pole plate of the first charge storage element,
the electric vehicle running control system further comprising a heating circuit control module configured for controlling the heating circuit to connect with or disconnect from the in-vehicle battery by controlling the bidirectional switchgear to switch on or off, and the heating circuit control module is connected with the first single-pole double-throw switch and the second single-pole double-throw switch, respectively, for reversing the voltage polarity of the first charge storage element by changing respective connection relations between the lead-in wire and the lead-out wires of the first single-pole double-throw switch and the second single-pole double-throw switch.

14. The electric vehicle running control system according to claim 13, wherein the polarity reversing unit comprises:
a second current storage element;
a first switch, in which the first switch, the first charge storage element and the second current storage element are connected in series sequentially to form a loop, and the heating circuit control module is connected with the first switch, for reversing the voltage polarity of the first charge storage element by controlling the first switch to switch on; and
a first unidirectional semiconductor element, in which the first unidirectional semiconductor element is connected in series between the first charge storage element and the second current storage element or between the second current storage element and the first switch.

15. The electric vehicle running control system according to claim 13, wherein the polarity reversing unit comprises:
a second charge storage element; and
a first DC-DC module, in which the heating circuit control module is connected with the first DC-DC module for transferring an energy in the first charge storage element to the second charge storage element, and then reversely transferring an energy in the second charge storage element back to the first charge storage element, by controlling the first DC-DC module, so as to reverse the voltage polarity of the first charge storage element.

16. The electric vehicle running control system according to claim 15, wherein the heating circuit further comprises an energy transferring unit for transferring an energy in the heating circuit to an energy storage element after the bidirectional switchgear is switched off from a switched-on state, and the energy transferring unit comprises an electric power recharging unit for transferring the energy in the heating circuit to the energy storage element after the bidirectional switchgear is switched off from the switched-on state, and
wherein the electric power recharging unit comprises a second DC-DC module, and the heating circuit control module is connected with the second DC-DC module for transferring an energy in the first charge storage element to the in-vehicle battery, by controlling the second DC-DC module.

17. The electric vehicle running control system according to claim 16, wherein the heating circuit further comprises an energy summing and transferring unit for transferring a part of an energy in the heating circuit to an energy storage element after the bidirectional switchgear is switched off from a switched-on state, and then summing a remaining energy in the heating circuit and an energy in the in-vehicle battery, and
wherein the energy summing and transferring unit comprises a third DC-DC module, and the heating circuit control module is connected with the third DC-DC module for transferring a part of an energy in the first charge storage element to the energy storage element, and then summing a remaining energy in the first charge storage element and the energy in the in-vehicle battery, by controlling the third DC-DC module.

18. The electric vehicle running control system according to claim 1, further comprising:
an energy limiting circuit for limiting a current flowing from the heating circuit to the in-vehicle battery.

19. The electric vehicle running control system according to claim 1, wherein the electric vehicle running control system further comprises an energy limiting circuit for limiting a current flowing from the heating circuit to the in-vehicle battery, and
wherein the energy limiting circuit comprises a third current storage element connected in series in the second unidirectional branch.

20. The electric vehicle running control system according to claim 19, wherein
the bidirectional switchgear comprises a second switch, a second unidirectional semiconductor element and a third unidirectional semiconductor element,
the second switch and the second unidirectional semiconductor element are connected in series to form the first unidirectional branch, the third unidirectional semiconductor element forms the second unidirectional branch,
the heating circuit control module is connected with the second switch for controlling the first unidirectional branch to be on or off by controlling the second switch to switch on or off, and
the third current storage element is connected with the third unidirectional semiconductor element in series.

21. The electric vehicle running control system according to claim 20, wherein
the bidirectional switchgear further comprises a third switch in the second unidirectional branch,
the third switch is connected with the third unidirectional semiconductor element in series,
the heating circuit control module is connected with the third switch for controlling the second unidirectional branch to be on or off by controlling the third switch to switch on or off, and
the third current storage element is connected in series between the third unidirectional semiconductor element and the third switch.

22. The electric vehicle running control system according to claim 21, wherein
the heating circuit further comprises a fourth unidirectional semiconductor element, a fifth unidirectional semiconductor element, a fourth switch, and a fifth switch,
a cathode of the fifth unidirectional semiconductor element is connected between the third switch and the third current storage element, an anode of the fifth unidirectional semiconductor element is connected to one end of the fifth switch, and another end of the fifth switch is connected to a negative electrode of the in-vehicle battery;
an anode of the fourth unidirectional semiconductor element is connected between the third unidirectional semiconductor element and the third current storage element, a cathode of the fourth unidirectional semiconductor element is connected to one end of the fourth switch, and another end of the fourth switch is connected to the negative electrode of the in-vehicle battery; and
the heating circuit control module is connected with the fourth switch and the fifth switch respectively for controlling the fourth switch and the fifth switch to switch on or off.

23. The electric vehicle running control system according to claim 22, wherein the heating circuit control module is configured for:
controlling the second switch and the third switch to switch on to enable an energy to flow from the in-vehicle battery to the first charge storage element and to flow from the first charge storage element to the in-vehicle battery;
switching off the third switch and switching on the fifth switch when a voltage applied to the first charge storage element is greater than a first predetermined voltage of the in-vehicle battery; and
switching off the fifth switch and switching on the third switch and the fourth switch when a current flowing through the third current storage element is zero, to enable the voltage polarity of the first charge storage element to reverse.

24. The electric vehicle running control system according to claim 22, wherein the heating circuit control module is configured for:
controlling the second switch and the third switch to switch on to enable an energy to flow from the in-vehicle battery to the first charge storage element and to flow from the first charge storage element to the in-vehicle battery;
switching off the third switch and switching on the fifth switch when a voltage applied to the first charge storage element is less than or equal to a second predetermined voltage of the in-vehicle battery;
switching off the fifth switch and switching on the third switch and the fourth switch when a current flowing through the third current storage element reaches a second predetermined current;
switching off the fourth switch when the current flowing through the third current storage element reaches a first predetermined current, to enable an energy in the third current storage element to flow to the in-vehicle battery; and
switching on the third switch and the fourth switch when the current flowing through the third current storage element is zero, to enable the voltage polarity of the first charge storage element to reverse.

25. An electric vehicle running control system, comprising:
a heating circuit;
a load capacitor;
a switchgear connected with the heating circuit and the load capacitor respectively; and
a switch control module connected with the switchgear for controlling the switchgear to switch off when the heating circuit is connected with an in-vehicle battery to form a heating loop for heating the in-vehicle battery,
wherein the heating circuit comprises a damping element, a bidirectional switchgear, a first current storage element and a first charge storage element, the damping element and the first current storage element are connected in series to form a first part, the bidirectional switchgear and the first charge storage element are connected in series to form a second part, one end of the first part is connected with a positive electrode of the in-vehicle battery, another end of the first part is connected with one end of the second part and one end of the switchgear respectively, and another end of the second part is connected with the load capacitor and a negative electrode of the in-vehicle battery; and
wherein the heating circuit further comprises an energy summing unit for summing an energy in the heating circuit and an energy in the in-vehicle battery after the bidirectional switchgear is switched off from a switched-on state, and the energy summing unit comprises a polarity reversing unit for reversing a voltage polarity of the first charge storage element after the bidirectional switchgear is switched off from the switched-on state.

26. An electric vehicle running control system, comprising:
- a heating circuit;
- a load capacitor;
- a switchgear connected with the heating circuit and the load capacitor respectively; and
- a switch control module connected with the switchgear for controlling the switchgear to switch off when the heating circuit is connected with an in-vehicle battery to form a heating loop for heating the in-vehicle battery,
- wherein the heating circuit comprises a damping element, a bidirectional switchgear, a first current storage element and a first charge storage element, the damping element and the first current storage element are connected in series to form a first part, the bidirectional switchgear and the first charge storage element are connected in series to form a second part, one end of the first part is connected with a positive electrode of the in-vehicle battery, another end of the first part is connected with one end of the second part and one end of the switchgear respectively, and another end of the second part is connected with the load capacitor and a negative electrode of the in-vehicle battery,
- wherein the heating circuit further comprises an energy summing unit for summing an energy in the heating circuit and an energy in the in-vehicle battery after the bidirectional switchgear is switched off from a switched-on state, and the energy summing unit comprises a polarity reversing unit for reversing a voltage polarity of the first charge storage element after the bidirectional switchgear is switched off from the switched-on state,
- wherein the heating circuit further comprises an energy transferring unit for transferring an energy in the heating circuit to an energy storage element after the bidirectional switchgear is switched off from a switched-on state, and the energy transferring unit comprises an electric power recharging unit for transferring the energy in the heating circuit to the energy storage element after the bidirectional switchgear is switched off from the switched-on state,
- wherein the heating circuit further comprises an energy summing and transferring unit for transferring a part of an energy in the heating circuit to an energy storage element after the bidirectional switchgear is switched off from a switched-on state, and then summing a remaining energy in the heating circuit and an energy in the in-vehicle battery, and wherein
- the energy summing and transferring unit comprises an energy summing unit and an energy transferring unit,
- the energy transferring unit is configured for transferring the part of the energy in the heating circuit to the energy storage element after the bidirectional switchgear is switched off from the switched-on state,
- the energy summing unit is configured for summing the remaining energy in the heating circuit and the energy in the in-vehicle battery after the part of the energy is transferred by the energy transferring unit,
- the energy transferring unit comprises an electric power recharging unit for transferring the part of the energy in the heating circuit to the energy storage element after the bidirectional switchgear is switched off from the switched-on state, and
- the energy summing unit comprises a polarity reversing unit for reversing the voltage polarity of the first charge storage element after the part of the energy is transferred by the electric power recharging unit.

* * * * *